(12) United States Patent
Jeon et al.

(10) Patent No.: US 11,178,683 B2
(45) Date of Patent: Nov. 16, 2021

(54) APPARATUS AND METHOD FOR TRANSMITTING SIGNALS USING FRONTHAUL IN COMMUNICATION SYSTEM

(71) Applicant: Samsung Electronics Co., Ltd., Suwon-si (KR)

(72) Inventors: Namryul Jeon, Suwon-si (KR); Daejoong Kim, Suwon-si (KR); Woojae Kim, Suwon-si (KR); Jaeyoel Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/788,512

(22) Filed: Feb. 12, 2020

(65) Prior Publication Data

US 2020/0260471 A1    Aug. 13, 2020

(30) Foreign Application Priority Data

Feb. 12, 2019    (KR) .......................... 10-2019-0016159

(51) Int. Cl.
*H04W 72/12*    (2009.01)
*H04W 72/08*    (2009.01)
*H04W 72/10*    (2009.01)

(52) U.S. Cl.
CPC ....... *H04W 72/1268* (2013.01); *H04W 72/08* (2013.01); *H04W 72/10* (2013.01)

(58) Field of Classification Search
CPC ...... H04L 47/22; H04W 72/08; H04W 72/10; H04W 72/1268
See application file for complete search history.

(56) References Cited

U.S. PATENT DOCUMENTS

2017/0126458 A1*  5/2017  Shattil ................. H04L 27/2615
2017/0373890 A1* 12/2017  Fertonani ............. H04B 1/1661
(Continued)

FOREIGN PATENT DOCUMENTS

WO    2019/015758 A1    1/2019

OTHER PUBLICATIONS

Ericsson Research, 'IEEE Std 802.1CM Time-Sensitive Networking for Fronthaul', May 22, 2018.
(Continued)

*Primary Examiner* — Saad A. Waqas
(74) *Attorney, Agent, or Firm* — Jefferson IP Law, LLP

(57) ABSTRACT

A method for transmitting signals by a first device of a base station transmitting and receiving signals of a wireless communication system is provided. The method includes receiving a plurality of uplink signals, identifying uplink transmission shaping information to be applied to the plurality of uplink signals, and transmitting the plurality of uplink signals to a second device by applying the uplink transmission shaping. The uplink transmission shaping information is information indicating for how many time intervals the first device is to transmit the plurality of uplink signals to the second device using a fronthaul. If the plurality of uplink signals are received by the first device for a first time, the plurality of uplink signals to which the uplink transmission shaping is applied are transmitted by the first device to the second device for the first time and a time determined based on the uplink transmission shaping information.

24 Claims, 23 Drawing Sheets

(56) References Cited

U.S. PATENT DOCUMENTS

| | | | |
|---|---|---|---|
| 2018/0042003 A1 | 2/2018 | Chen et al. | |
| 2018/0159611 A1 | 6/2018 | Majmundar et al. | |
| 2018/0227028 A1 | 8/2018 | Lee | |
| 2018/0294869 A1 | 10/2018 | Kennard | |
| 2018/0310244 A1 | 10/2018 | Wich et al. | |
| 2018/0359770 A1 | 12/2018 | Huang et al. | |
| 2019/0254047 A1* | 8/2019 | Ahmed | H04L 47/30 |
| 2019/0281501 A1* | 9/2019 | Berg | H04W 28/0268 |
| 2019/0289497 A1* | 9/2019 | Rajagopal | H04L 25/0256 |
| 2020/0145967 A1* | 5/2020 | Park | H04W 72/0426 |
| 2020/0235788 A1* | 7/2020 | Rajagopal | H04B 7/024 |

OTHER PUBLICATIONS

International Search Report dated May 19, 2020, issued in International Application No. PCT/KR2020/001974.

Written Opinion dated May 19, 2020, issued in International Application No. PCT/KR2020/001974.

\* cited by examiner

APPARATUS AND METHOD FOR TRANSMITTING SIGNALS USING FRONTHAUL IN COMMUNICATION SYSTEM

CROSS-REFERENCE TO RELATED APPLICATION(S)

This application is based on and claims priority under 35 U.S.C. § 119(a) of a Korean patent application number 10-2019-0016159, filed on Feb. 12, 2019, in the Korean Intellectual Property Office, the disclosure of which is incorporated by reference herein in its entirety.

BACKGROUND

1. Field

The disclosure relates to an apparatus and a method for transmitting signals of a base station in a wireless communication system. More particularly, the disclosure relates to an apparatus and a method for efficiently transmitting signals using a fronthaul.

2. Description of Related Art

In the related art, a base station providing a mobile communication service is of an integrated type in which a digital unit (DU) and a radio unit (RU) of the base station are installed together in a cell site. However, the base station of such a type is not suitable for needs of a mobile communication operator that intends to establish a plurality of cell sites in accordance with the increase of users and traffics, and in order to improve this, a centralized radio access network (C-RAN) or cloud RAN structure has appeared. The C-RAN has a structure in which the DU is intensively deployed in one physical place, and only the RU remains in the cell site actually transmitting and receiving a radio signal with a terminal, and the DU and the RU may be connected to each other by an optical cable or a coaxial cable. Further, as the RU and the DU are separated from each other, interface specifications for communication between the RU and the DU become necessary, and specifications, such as a common public radio interface (CPRI) and the like, have currently been used.

Further, in order to satisfy a demand for radio data traffics, a fifth-generation communication system (hereinafter, 5th generation (5G) system, which may be interchangeably used with a new radio or next radio (NR) system) has currently been researched, and it is expected that services of a high data rate can be provided to users through the 5G system. Further, it is expected that wireless communication services having various purposes, such as the Internet of things and services requiring high reliability for specific purposes, can be provided.

The above information is presented as background information only to assist with an understanding of the disclosure. No determination has been made, and no assertion is made, as to whether any of the above might be applicable as prior art with regard to the disclosure.

SUMMARY

However, with the commercialization of a fifth-generation communication system (hereinafter, 5G system, which may be interchangeably used with a new radio or next radio (NR) system), the transmission capacity of a fronthaul connecting between an radio unit (RU) and a digital unit (DU) should be greatly increased to cope with high throughput of an NR cell. In order to increase the transmission capacity of the fronthaul, it is required to install a wired network having much more bandwidths, and thus there is a need for a method for reducing the transmission capacity of the fronthaul.

Aspects of the disclosure are to address at least the above-mentioned problems and/or disadvantages and to provide at least the advantages described below. Accordingly, an aspect of the disclosure is to provide a method for transmitting signals by a first device of a base station transmitting and receiving signals of a wireless communication system includes receiving a plurality of uplink signals from a plurality of terminals, identifying uplink transmission shaping information to be applied to the plurality of uplink signals, and transmitting the plurality of uplink signals to a second device by applying the uplink transmission shaping. The uplink transmission shaping information comprises information indicating a number of time intervals to transmit the plurality of uplink signals received for a specific time interval to the second device using a fronthaul. If the plurality of uplink signals are received by the first device for a first time duration, the plurality of uplink signals to which the uplink transmission shaping is applied are transmitted by the first device to the second device for a time duration determined based on the uplink transmission shaping information and the first time duration.

Additional aspects will be set forth in part in the description which follows and, in part, will be apparent from the description, or may be learned by practice of the presented embodiments.

In accordance with an aspect of the disclosure, a method for receiving signals by a second device of a base station transmitting and receiving signals of a wireless communication system is provided. The method includes identifying uplink transmission shaping information to be applied to a plurality of uplink signals, and receiving, from a first device, the plurality of uplink signals to which uplink transmission shaping is applied based on the uplink transmission shaping information. The uplink transmission shaping information comprises information indicating a number of time intervals to transmit the plurality of uplink signals received for a specific time interval to the second device using a fronthaul. If the plurality of uplink signals are received by the first device for a first time duration, the plurality of uplink signals to which the uplink transmission shaping is applied are transmitted by the first device to the second device for a time duration determined based on the uplink transmission shaping information and the first time duration.

In accordance with another aspect of the disclosure, a first device of a base station transmitting and receiving signals of a wireless communication system is provided. The first device includes a transceiver configured to transmit and receive signals with a plurality of terminals, an interface configured to transmit and receive signals with a second device, and a processor connected to the transceiver and the interface and configured to receive a plurality of uplink signals from a plurality of terminals, identify uplink transmission shaping information to be applied to the plurality of uplink signals, and transmit the plurality of uplink signals to a second device by applying the uplink transmission shaping. The uplink transmission shaping information comprises information indicating a number of time intervals to transmit the plurality of uplink signals received for a specific time interval to the second device using a fronthaul. If the plurality of uplink signals are received by the first device for a first time duration, the plurality of uplink signals to which the uplink transmission shaping is applied are transmitted by the first device to the second device for a time duration determined based on the uplink transmission shaping information and the first time duration.

In accordance with another aspect of the disclosure, a second device of a base station transmitting and receiving signals of a wireless communication system is provided. The second device includes an interface configured to transmit and receive signals with a first device, and a processor connected to the interface and configured to identify uplink transmission shaping information to be applied to a plurality of uplink signals, and receive, from the first device, the plurality of uplink signals to which uplink transmission shaping is applied based on the uplink transmission shaping information. The uplink transmission shaping information comprises information indicating a number of time intervals to transmit the plurality of uplink signals received for a specific time interval to the second device using a fronthaul. If the plurality of uplink signals are received by the first device for a first time duration, the plurality of uplink signals to which the uplink transmission shaping is applied are transmitted by the first device to the second device for a time duration determined based on the uplink transmission shaping information and the first time duration.

According to the embodiments of the disclosure, the transmission capacity of the fronthaul can be effectively reduced, and thus the cost for installing the fronthaul can be reduced. Further, even in the case of using the fronthaul having a small transmission capacity, signals are transmitted in accordance with a transmission priority, and thus the signals can be efficiently transmitted without reducing the transmission delay or the transmission capacity.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description, taken in conjunction with the accompanying drawings, in which.

Throughout the drawings, like reference numerals will be understood to refer to like parts, components, and structures.

DETAILED DESCRIPTION

Figure 1:
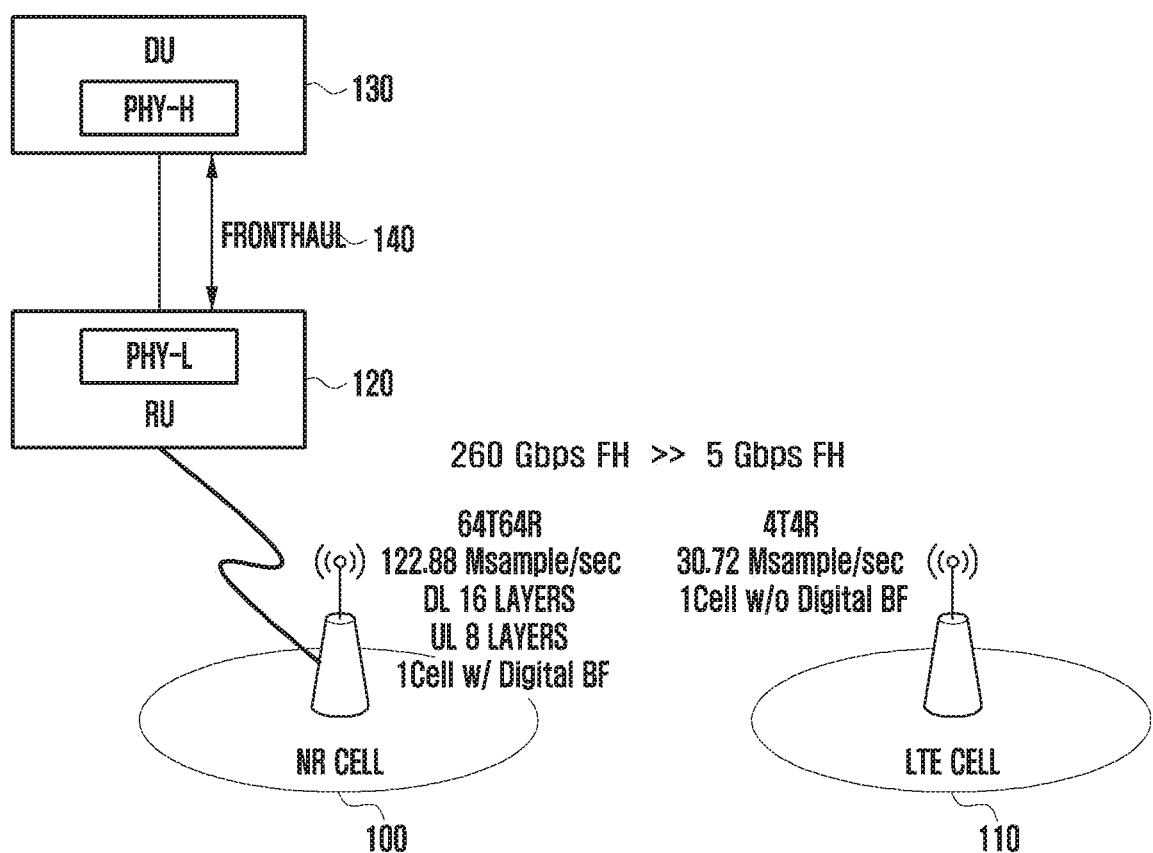
FIG. 1 is a diagram illustrating an example of a low layer function split through RU-DU that can be introduced in an NR system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, in explaining embodiments of the disclosure in detail, the main gist of the disclosure can be applied to other communication system having similar technical backgrounds and channel types through slight modifications within the range that does not greatly deviate from the scope of the disclosure, and this will be possible by the judgment of those skilled in the art to which the disclosure pertains.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as field programmable gate array (FPGA) or application specific integrated circuit (ASIC), which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more central processing units (CPUs) in a device or a security multimedia card.

In the disclosure, an uplink (UL) means a radio link on which a terminal (user equipment (UE) or mobile station (MS)) transmits data or a control signal to a base station (eNode B or base station (BS)), and a downlink (DL) means a radio link on which a base station transmits data or a control signal to a terminal. Further, a base station is the subject that performs resource allocation to a terminal, and it may be at least one of eNode B, Node B, base station (BS), generation Node B (gNB), radio access unit, base station controller, or node on a network. A terminal may include user equipment (UE), mobile station (MS), cellular phone, smart phone, computer, or multimedia system that can perform a communication function.

FIG. 1 is a diagram illustrating an example of a low layer function split through RU-DU that can be introduced in an NR system according to an embodiment of the disclosure.

Referring to FIG. 1, a radio unit (RU) 120 and a digital unit (DU) 130 may be connected to each other through a fronthaul (FH) 140. In this case, the RU and the DU may dividedly perform the functions of respective physical layers, and the RU may be located on one cell site. If it is assumed that one cell that does not use digital beamforming, four transmission antennas and four reception antennas are provided in the case where the RU 120 is to be used for a long term evolution (LTE) cell 110, the RU should process the capacity of 30.72 Msamples/sec, whereas if it is assumed that one cell that uses digital beamforming, 64 transmission antennas and 64 reception antennas are provided, and 16 layers are used in a downlink and 8 layers are used in an uplink, in the case where the RU 120 is to be used for an NR cell 100, the RU should process the capacity of 122.8872 Msamples/sec.

That is, it may be expected that the capacity to be processed by the RU in the NR system is increased about four times the capacity in the LTE system. This means that the capacity of the FH 140 should be increased as much as the capacity to be processed by the RU. In order to increase the capacity of the FH, a wired network should be expanded to increase the FH bandwidth, and this may cause a great economic burden to an operator.

Figure 2:
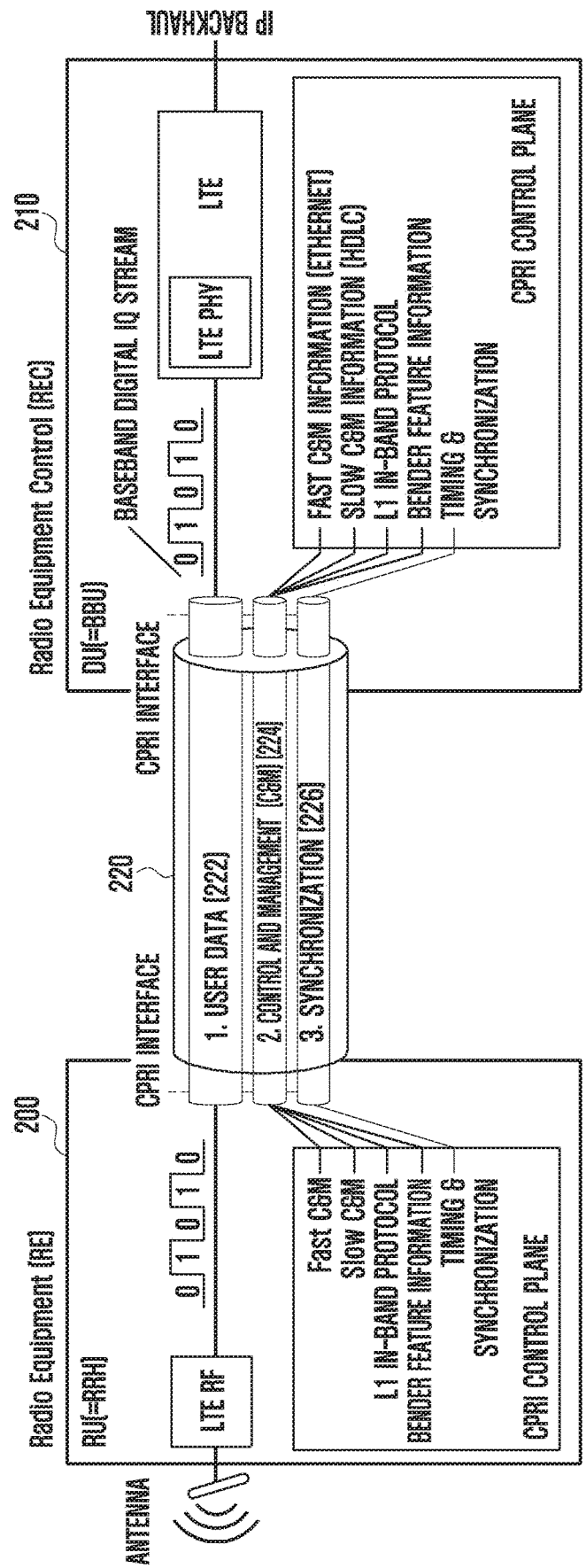
FIG. 2 is a diagram illustrating the structure of a common public radio interface (CPRI) that is an interface specification in the related art between radio unit (RU) and digital unit (DU) according to an embodiment of the disclosure.

FIG. 2 is a diagram illustrating the structure of a common public radio interface (CPRI) that is an interface specification in the related art between RU and DU according to an embodiment of the disclosure.

Referring to FIG. 2, a radio equipment control (REC) (this may be interchangeably used with a DU or a base band unit (BBU)) 210 and a radio equipment (RE) (this may be interchangeably used with an RU or a remote radio head (RRH)) 200 transmit and receive briefly three kinds of information through a CPRI interface 220 (this can be understood as a fronthaul interface). Through the CPRI interface 220, user data 222, control and management information 224, and synchronization information 226 are transmitted and received, and the user data 222 is transferred by the REC in the form of a baseband digital IQ stream, and the RE having received this converts the user data 222 into an analog signal to be transmitted to a terminal. The control and management information 224 includes information necessary for operations of establishing and releasing a control and management link and a CPRI link and information necessary for data transmission, and the synchronization information 226 includes information to match synchronization and timing between the REC and the RE.

Figure 3A:
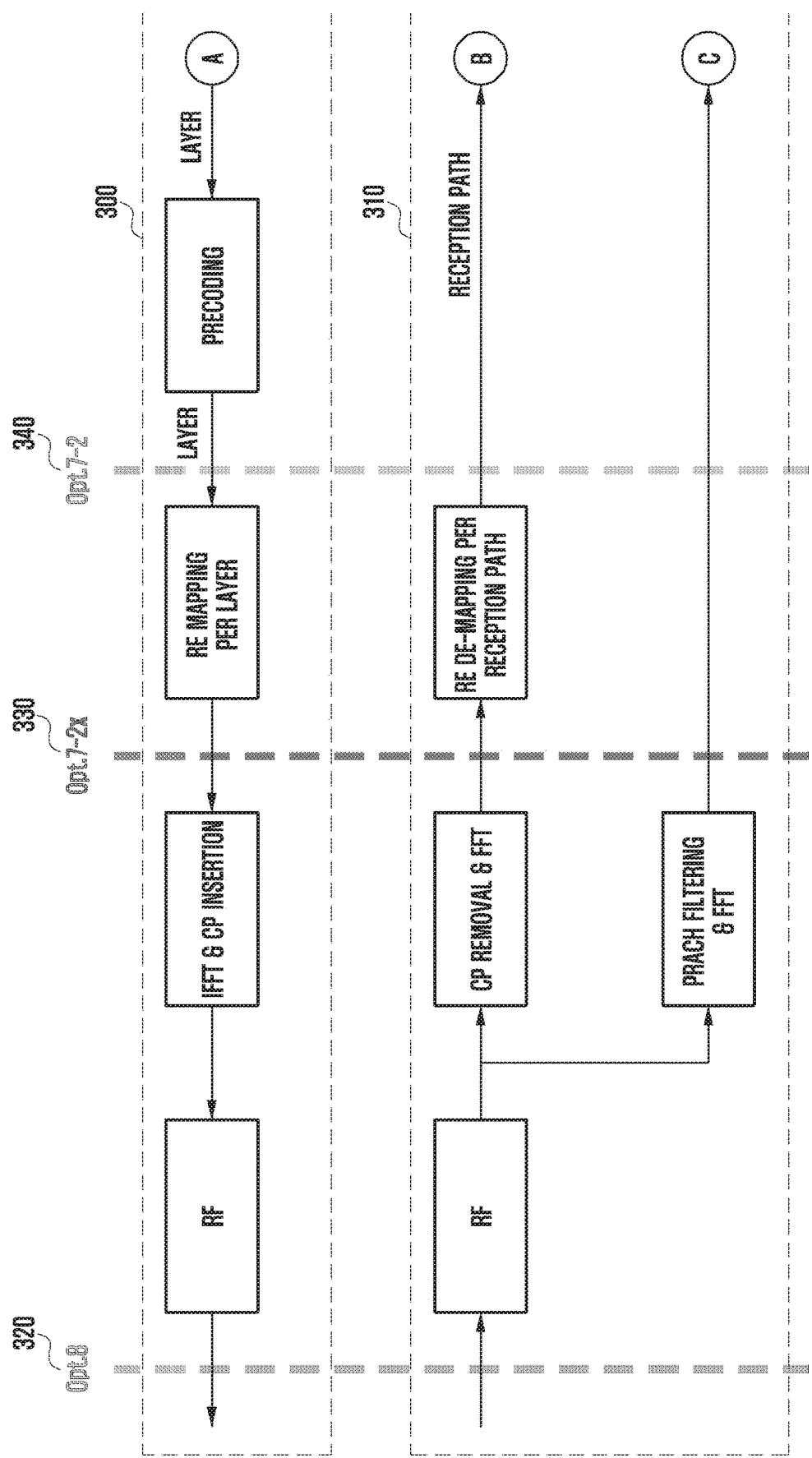
FIG. 3A is a diagram illustrating an example of RU-DU function distribution according to an embodiment of the disclosure.
Figure 3B:
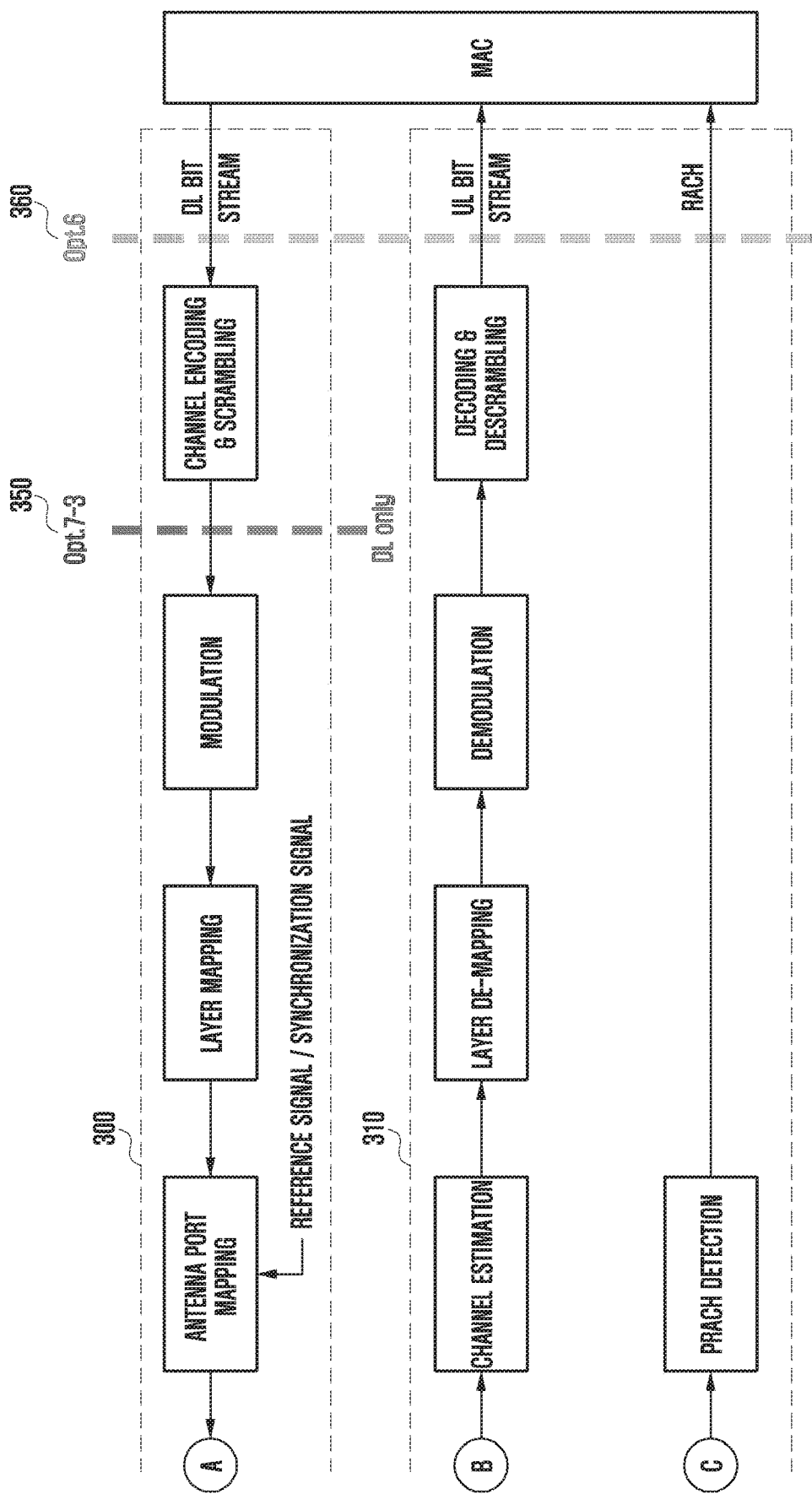
FIG. 3B is a diagram illustrating an example of RU-DU function distribution according to an embodiment of the disclosure.

FIGS. 3A and 3B illustrate a process being performed by a physical layer in the case of uplink (UL) and downlink (DL) transmission and reception 310 and 300 according to various embodiments of the disclosure.

Various options exist in function distribution, and as an example, option 8 320, option 7-2x 330, option 7-2 340, option 7-3 (this exists only in the case of the DL) 350, and option 6 360 may exist. In this case functions located on the right side based on one option may be performed by the DU, and functions located on the left side may be performed by the RU. As an example, the CPRI of the LTE system corresponds to option 8, and in the case of a downlink, the DU transmits a signal for which all processes of the physical layer as illustrated in FIGS. 3A and 3B have been performed to the RU through the FH, and the RU only performs conversion of the received signal into an analog signal and transmission of the converted analog signal to the terminal.

Referring to FIGS. 3A and 3B, the FH bandwidths necessary for the above-described options are described in Table 1 below. Table 1 describes a case where an NR system having 6 GHz or less uses 100 MHz, and 64 transmission antennas and 64 reception antennas with beamforming, and 16 layers are used in a DL and 8 layers are used in a UL.

a need for a method for solving asymmetry of the UL and DL FH capacities. Although the disclosure is to solve the above described problem, the disclosure is not limited thereto, but it may be used to properly control the UL and DL FH capacities.

Figure 4:
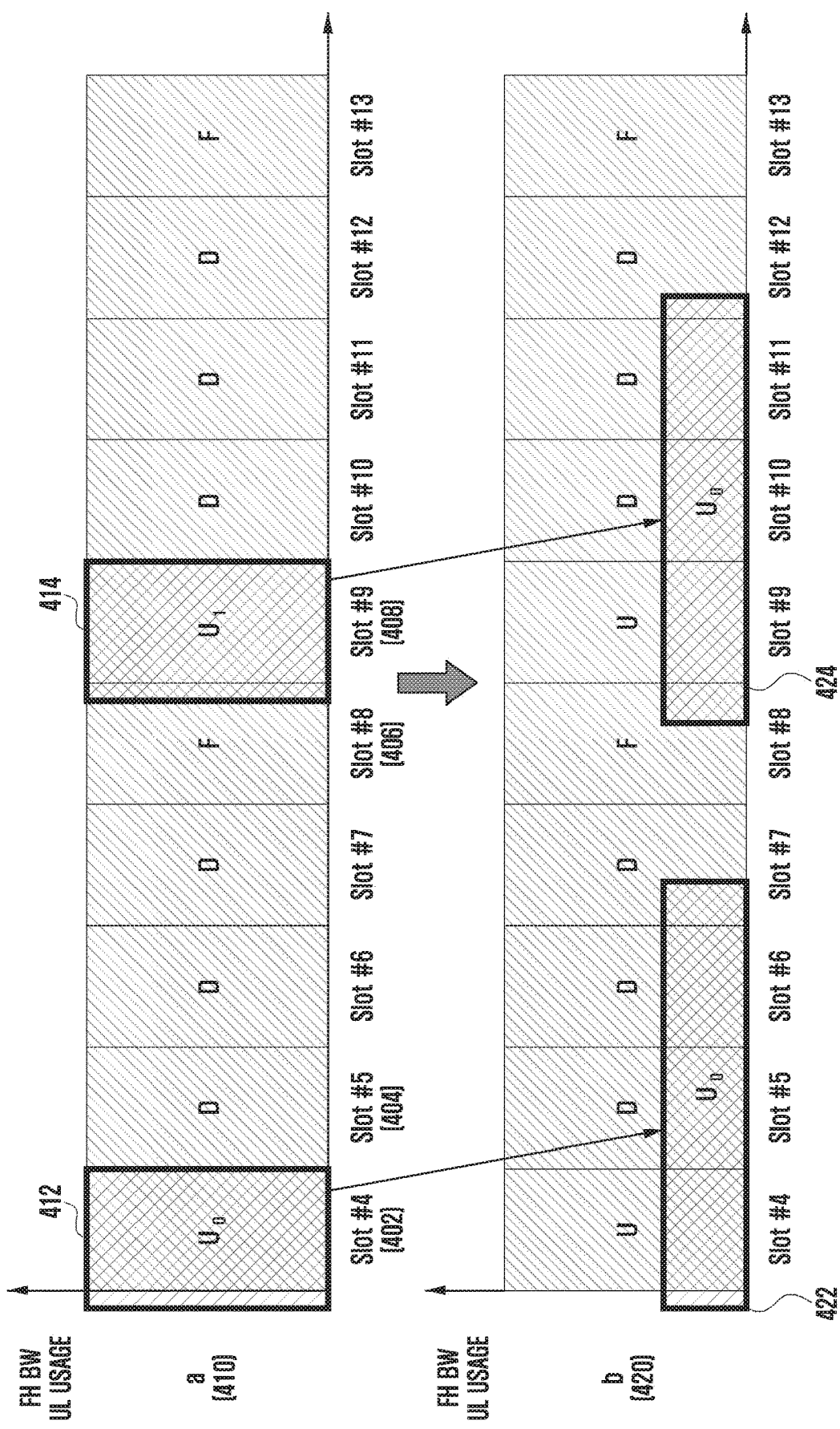
FIG. 4 is a diagram illustrating an example of uplink (UL) traffic shaping according to an embodiment of the disclosure.

FIG. 4 is a diagram illustrating an example of UL traffic shaping according to an embodiment of the disclosure.

In an NR system, in contrast with an LTE system in which a frequency division duplex (FDD) is mainly used, there is a high possibility to introduce a time division duplex (TDD) that divides resources on a time axis in one frequency band and uses the divided resources as DL resources and UL resources, and FIG. 4 illustrates the example on the assumption of such a case. However, the disclosure is not limited to the case of the TDD.

Referring to FIG. 4, in the NR system to which the TDD is applied, a slot that is a basic unit of a time axis includes a plurality of symbols (in particular, 14 symbols), and the slot may be one of a UL slot composed of UL symbols in all, a DL slot composed of DL symbols in all, and a flexible slot composed of UL symbols, DL symbols, and/or flexible symbols the purpose of which is not predetermined. As an example, as shown in FIG. 4, slot #4 402 may be a UL slot, slot #5 404 may be a DL slot, and slot #8 406 may be a flexible slot.

In this case, the FH may be used in accordance with respective time resources. In the case of a(410) of FIG. 4, because slot #4 402 is a UL slot, the RU may transmit a received UL signal to the DU through the UL FH for a time corresponding to one slot in slot #4 402 ($U_0$, 412). Further, in the same manner, because slot #9 408 is a UL slot, the RL may transmit a received UL signal to the DU through the UL FH for a time 414 corresponding to one slot in slot #9 408.

However, in the case of a(410), the UL FH is not used for slot #5 to #8 406 that are DL slots and flexible slots. Accordingly, as in the case of b(420), if the RU transmits the received UL signal to the DU through the UL FH in slot #4 402 for a time further including slot #4 402 to slot #7, the signals to be transmitted have the same quantity, and thus it is possible to transmit the same signal using ⅓ or less of the

TABLE 1

| Option | 8 | 7-1 | 7-2x | 7-2 | 7-3 | 6 |
|---|---|---|---|---|---|---|
| DL | 259.52 (Gbps) | 169.07 | 45.93 | (Undefined) | 18.38 | (Undefined) |
| UL | 259.52 | 205.69 | 57.75 | (Undefined) | (Impossible) | (Undefined) |

As can be seen from the above table, as the option is located on the right side in FIGS. 3a and 3b, that is, as the DU does not perform many functions of the physical layer and the RU performs many functions of the physical layer, the necessary FH bandwidth becomes low. However, in consideration of difficulty in implementation, it is assumed that option 7-2x is used in the case of the UL and option 7-3 or other options having similar transmission capacities are used in the case of the DL. In this case, the FH transmission capacity necessary for the DL transmission is 18.38 Gbps, and the FH transmission capacity necessary for the UL reception is 57.75 Gbps, so that the FH transmission capacity for the UL becomes about three times higher than the FH transmission capacity for the DL. Because it is general that the DL and the UL having the same capacity are installed on the FH line, it causes a great burden to an operator to install the FH transmission network capable of processing the capacity of 60 Gbps for the UL reception, and thus there is FH frequency band ($U_0$, 422). Further, if the RU transmits the received UL signal to the DU through the UL FH in slot #9 408 for a time including slot #9 408 to slot #12, it is also possible to transmit the same signal using ⅓ or less of the FH frequency band of the signal to be transmitted ($U_1$, 424). This may be called UL shaping (it can be interpreted as UL fronthaul modification, UL fronthaul setting, UL fronthaul configuration, etc.). That is, by lengthening a transmission time through the UL FH through transmission of the UL signal for a time including a DL resource time interval, the transmission amount being transmitted per unit time is reduced, and thus the necessary FH capacity can be reduced.

Hereinafter, a detailed method for performing UL shaping will be described.

Figure 5:
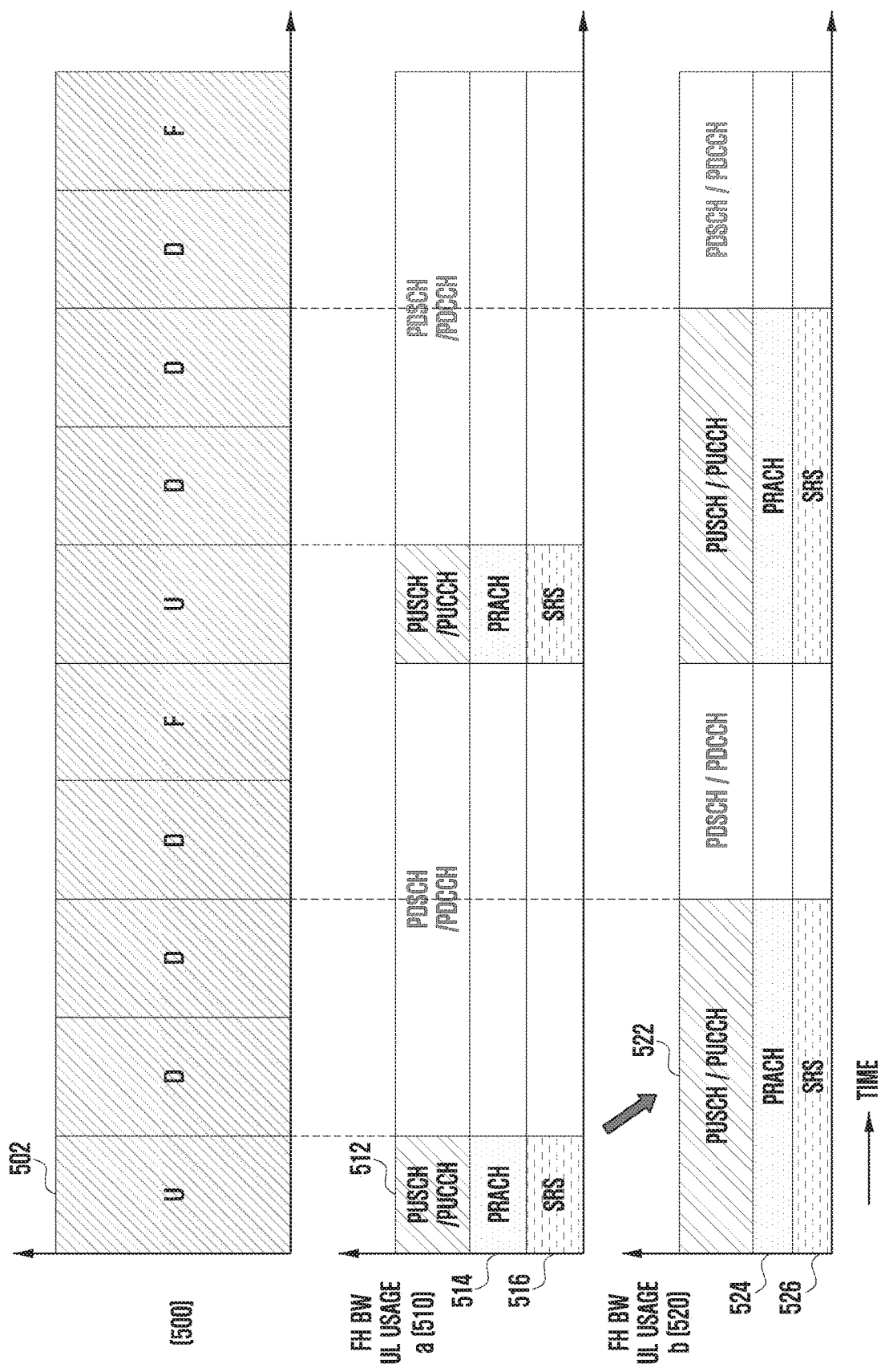
FIG. 5 is a diagram illustrating an example of UL shaping performance in the case of a CPRI mapper according to an embodiment of the disclosure.

FIG. 5 is a diagram illustrating an example of performing UL shaping in the case of a CPRI mapper according to an embodiment of the disclosure.

The CPRI mapper uses a fixed mapper having a fixed rate. That is, even if there is not a signal to be actually transmitted, the transmission is performed at a fixed speed. Accordingly, in the case of transmitting the UL signal from the RU to the DU using the CPRI matter, the transmission may be performed in a state where the resource ratio per channel in the mapper is fixed, the transmission amount per constant time is reduced, and the transmission time is lengthened on a time axis.

Referring to FIG. 5, "500" means a time-axis resource structure of an NR system. In FIG. 5, two methods in which an RU transmits a received signal to a DU in a UL slot 502 are illustrated. In the UL slot 502, the RU may receive a physical uplink shared channel (PUSCH) (UL data (and UL control information) is received through the PUSCH), a physical uplink control channel (PUCCH) (UL control information is received through the PUCCH), a physical random access channel (PRACH) (a random access preamble is received through the PRACH, and a sounding reference signal (SRS).

In the case of a(510) that is the first method, if the RU receives the PUSCH and/or PUCCH 512, PRACH 514, and SRS 516 for a time corresponding to a UL slot 502, the RU transmits them to the DU for the same time. However, in the case of b(520) that is the second method, the RU transmits an uplink signal received from the UL slot 502 to the DU for three slots or more. In this case, it can be known that the resource ratio of the PUSCH and/or PUCCH 522, PRACH 524, and SRS 526 being transmitted to the DU is the same as that in the case of a(510), but their transmission amount becomes small. That is, (the resource amount necessary to transmit one frame per mapper×transmission time) becomes constant.

Figure 6:
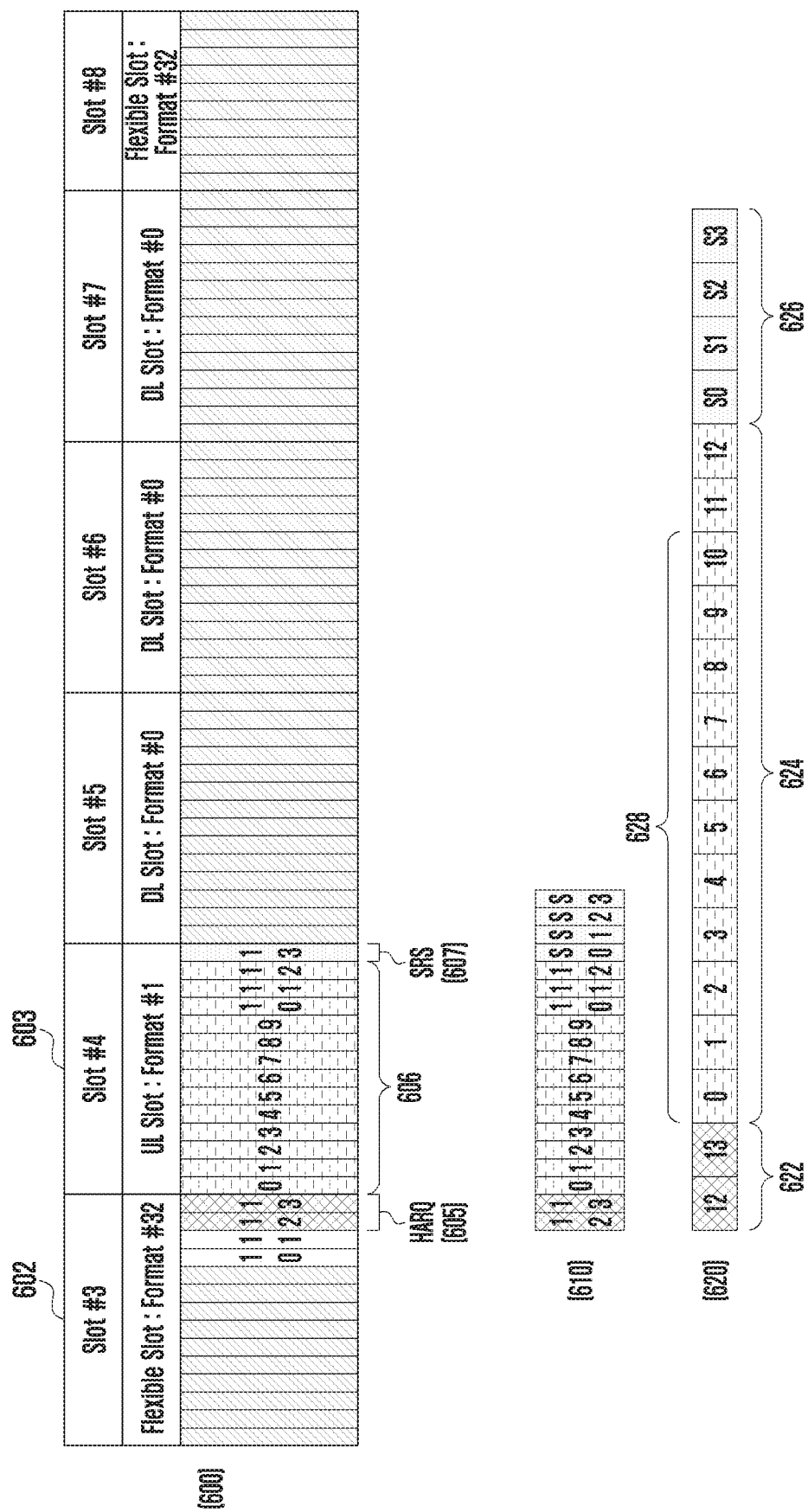
FIG. 6 is a diagram illustrating an example of UL shaping in the case of a packet based transmission such as enhanced common public radio interface (CPRI) (eCPRI) or radio over Ethernet (RoE) according to an embodiment of the disclosure.

FIG. 6 is a diagram illustrating an example of UL shaping in the case of a packet based transmission such as enhanced CPRI (eCPRI) or radio over Ethernet (RoE) according to an embodiment of the disclosure.

In the case of such a packet based transmission, an RU makes packets in the order of received UL signals at a UL slot time, and it transmits the packets to a DU through an FH. Accordingly, the transmission effect occurs through natural extension on a time axis in accordance with the FH capacity (if the transmission amount per hour is limited). However, in this case, the RU transmitting the UL signal should have buffers enough to store all UL signals being received for the UL slot time, and the DU should also have such buffers. Further, depending on whether to actually perform scheduling, it may differ whether to use the FH. That is, because the UL makes the packet to be transmitted to the DU using only the UL data received from the terminal, the time when transmission/reception of the corresponding data stream chunk is ended may be continuously varied.

Referring to FIG. 6, "600" is a diagram illustrating TDD NR time-axis resources. Slot #4 603 is a UL slot, and an RU receives a UL signal from a terminal. In this case, in slot #4 603, a PUSCH or PUCCH 606 and an SRS 607 may be transmitted. Further, two hindmost symbols 605 of slot #3 602 that is a flexible slot may be UL symbols, and even in the UL symbols, the terminal may transmit a hybrid automatic repeat request (HARQ) acknowledgement/non-acknowledgement (ACK/NACK) that is the UL signal on the PUCCH. In this case, "610" illustrates an example in which the RU immediately makes packets in the order of symbols in which the RU receives the UL signal in the UL slot time and transmits the packets to the DU. However, "620" is an example in which the RU uses a time interval of slot #4 603 to slot #7 to transmit the UL signal received from slot #4 603, and is an example in which 6 symbols 622 are used to transmit the HARQ ACK/NACK signal received at the time of the two symbols 605. In this case, the RU may use 39 symbols 624 to transmit the PUSCH or PUCCH 606 received at the time of 13 symbols to the DU. Further, the RU may use 12 symbols 626 to transmit the SRS 607 received from one symbol to the DU.

Further, although "620" illustrates that the PUSCH or PUCCH is transmitted using symbols #0 to #13 in slot #4 603, the terminal may not always transmit the UL signal using all of symbol #0 to #13, and the terminal may transmit the PUSCH or PUCCH using only a part of the symbols. As an example, if the RU has received the PUSCH using symbol #0 to #10 of slot #4 603, the RU may transmit the same to the DU using 33 symbols 628, and thereafter, the RU may immediately perform SRS transmission.

Figure 7:
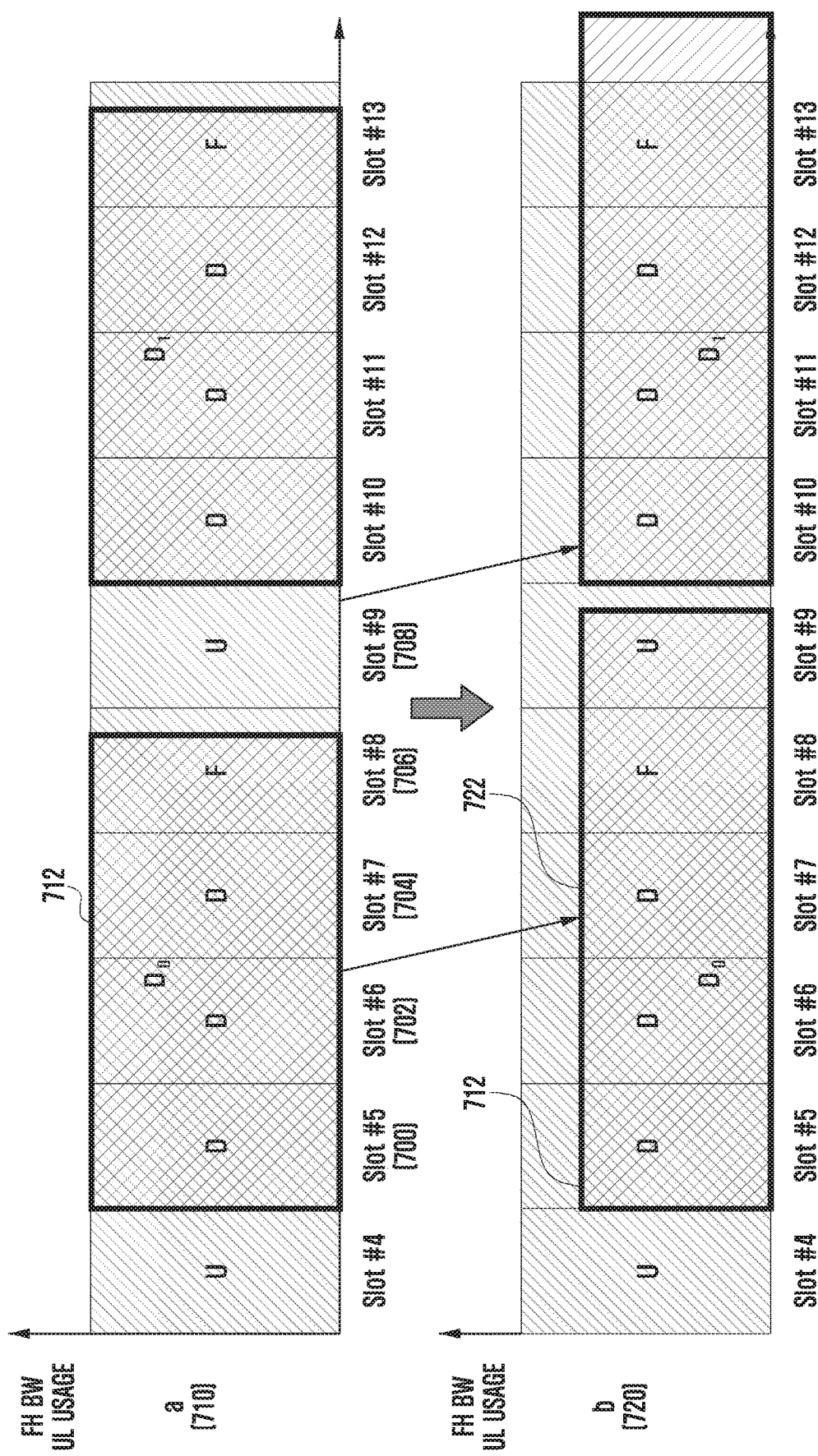
FIG. 7 is a diagram illustrating an example of downlink (DL) traffic shaping according to an embodiment of the disclosure.

FIG. 7 is a diagram illustrating an example of DL traffic shaping according to an embodiment of the disclosure.

The DL traffic shaping is to transmit a DL signal using up to a UL resource time interval, and in the case of using this, the DL FH capacity can be lowered to a 4/5 level against the existing DL FH capacity if DL and UL resources exist in the ratio of 4:1 in a TDD system.

Referring to FIG. 7, in the case of a(710), slot #5 700, slot #6 702, slot #7 704, and slot #8 706, which are DL slots and flexible slots, may transmit the DL signal transmitted from a DU to an RU through a DL FH for a time corresponding to slot #5 702 to slot #8 708 ($D_0$, 712). However, in the case of a(710), the UL FH is not used for slot #9 708 that is a UL slot. Accordingly, if the DL signal received by the DU for slot #5 700 to slot #9 708 is transmitted to the RU through the DL FH as in the case of b(720), the signals to be transmitted have the same quantity, and thus it is possible to transmit the same signal using 4/5 or less of the DL FH frequency band ($U_0$, 722). This may be called DL shaping. That is, by lengthening a transmission time through the DL FH through transmission of the DL signal for a time including a UL resource time interval, the transmission amount being transmitted per unit time is reduced, and thus the necessary FH capacity can be reduced.

In the case of performing the UL traffic shaping as described above, it is necessary for the RU to give different priorities to UL channels and signals and to first transmit the channel or signal having a higher priority through the FH. This is because timing requirements necessary for the respective channels and signals exist. As an example, the signal such as the HARQ ACK/NACK is sensitive to latency because it is determined whether a base station retransmits DL data to a terminal based on the signal, but the SRS that is a reference signal being used to measure the UL channel is not so sensitive to the latency. Further, because some channels and signals are always necessary to perform communication between the base station and the terminal and to maintain their connection, whereas some channels and signals are not necessary, it is necessary to first transmit the channels or signals that are always necessary. As an example, because the PRACH is a channel being transmitted by the terminal to access the base station, it is necessary to configure a high priority to the PRACH.

Figure 8:
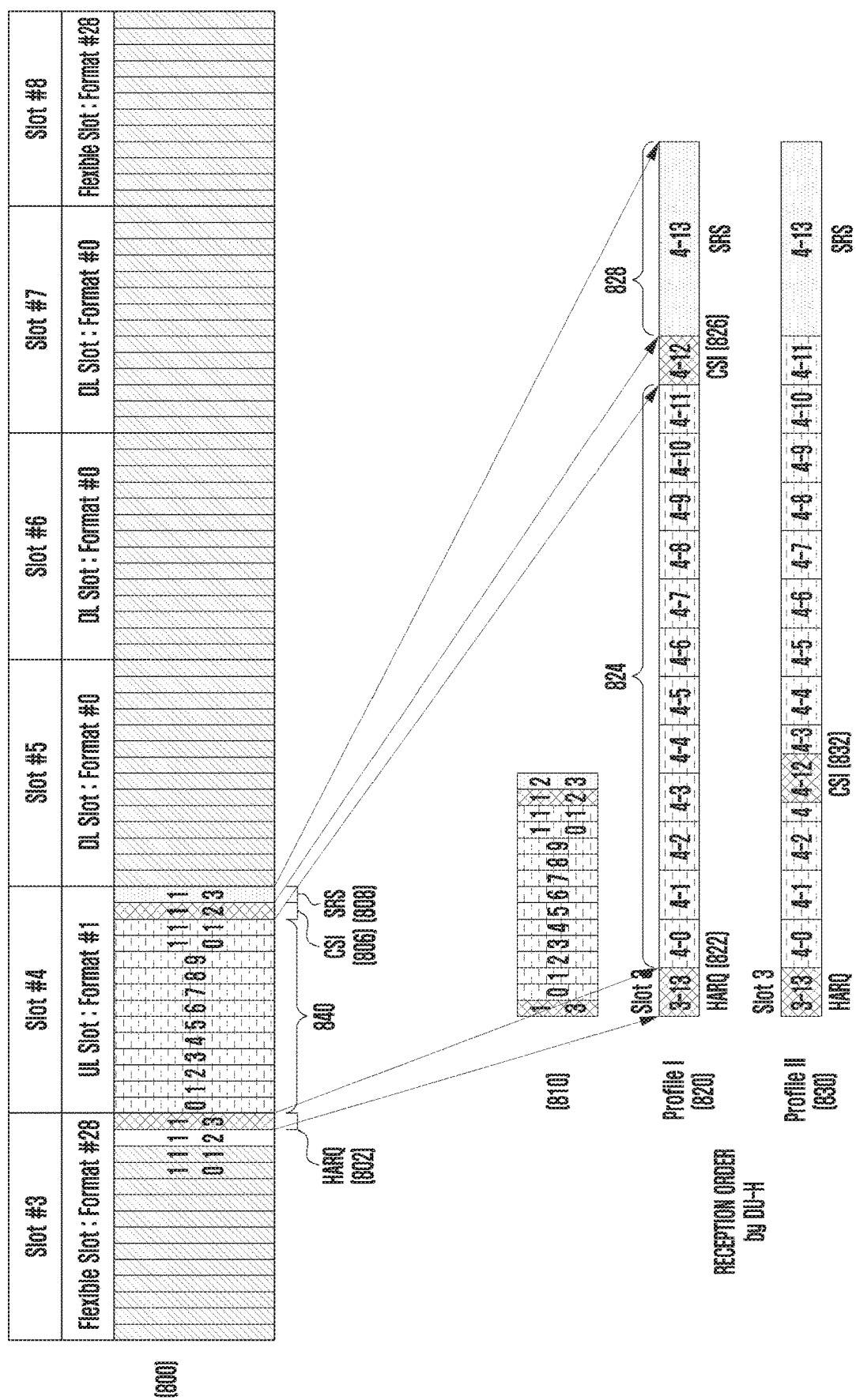
FIG. 8 is a diagram illustrating an example in which RU performs UL traffic shaping in the case of applying a priority according to an embodiment of the disclosure.

FIG. 8 is a diagram illustrating an example in which RU performs UL traffic shaping in the case of applying the above-described priority according to an embodiment of the disclosure.

Profile I is a case of having a priority of a UL control signal (DL HARQ ACK/NACK, channel state information (CSI) (can be interchangeably used with channel information), scheduling request (SR), PRACH)=UL data>SRS, and profile II is a case of having a priority of a UL control signal (DL HARQ ACK/NACK, CSI, SR, PRACH)>UL data>SRS.

Referring to FIG. 8, according to "800", the HARQ ACK/NACK 802 is received in the RU in symbol #13 of slot #3, and the UL data is received in the RU 840 in symbol #0 to symbol #11 of slot #4. The CSI 806 is received in symbol #12, and the SRS 808 is received in symbol #13. According to the profile I 820, in the same order of RU's signal reception, the RU transmits the signal to the DU in the order of HARQ ACK/NACK 822, PUSCH 824, CSI 826, and SRS 828. Because the UL data and the UL control signal have the same priority, the RU transmits the signal to the DU in the order of the signal reception. According to profile II 830, in the middle of "824" transmitting the UL data, CSI transmission 832 is included. This is because the priority of the UL control signal is higher than the priority of the UL data, and in the case of receiving the UL control signal from the terminal, the RU stops the transmission of the DL data, and after the transmission of the UL control signal, the RU may resume the transmission of the DL data being stopped. Further, the CSI transmission 832 of the RU is performed after 6 symbols after the CSI reception (symbol #12 of slot #4) of the RU, and this may be a processing time required for the RU to receive the UL signal and to make the packets to be transmitted to the DU.

Further, the priority of the UL data may be determined in accordance with the quality of service (QoS) of bearer related to the data. If the QoS indicates a real-time or urgent service, the RU may preferentially transmit the UL data of the bearer having the QoS to the DU.

Figure 9A:
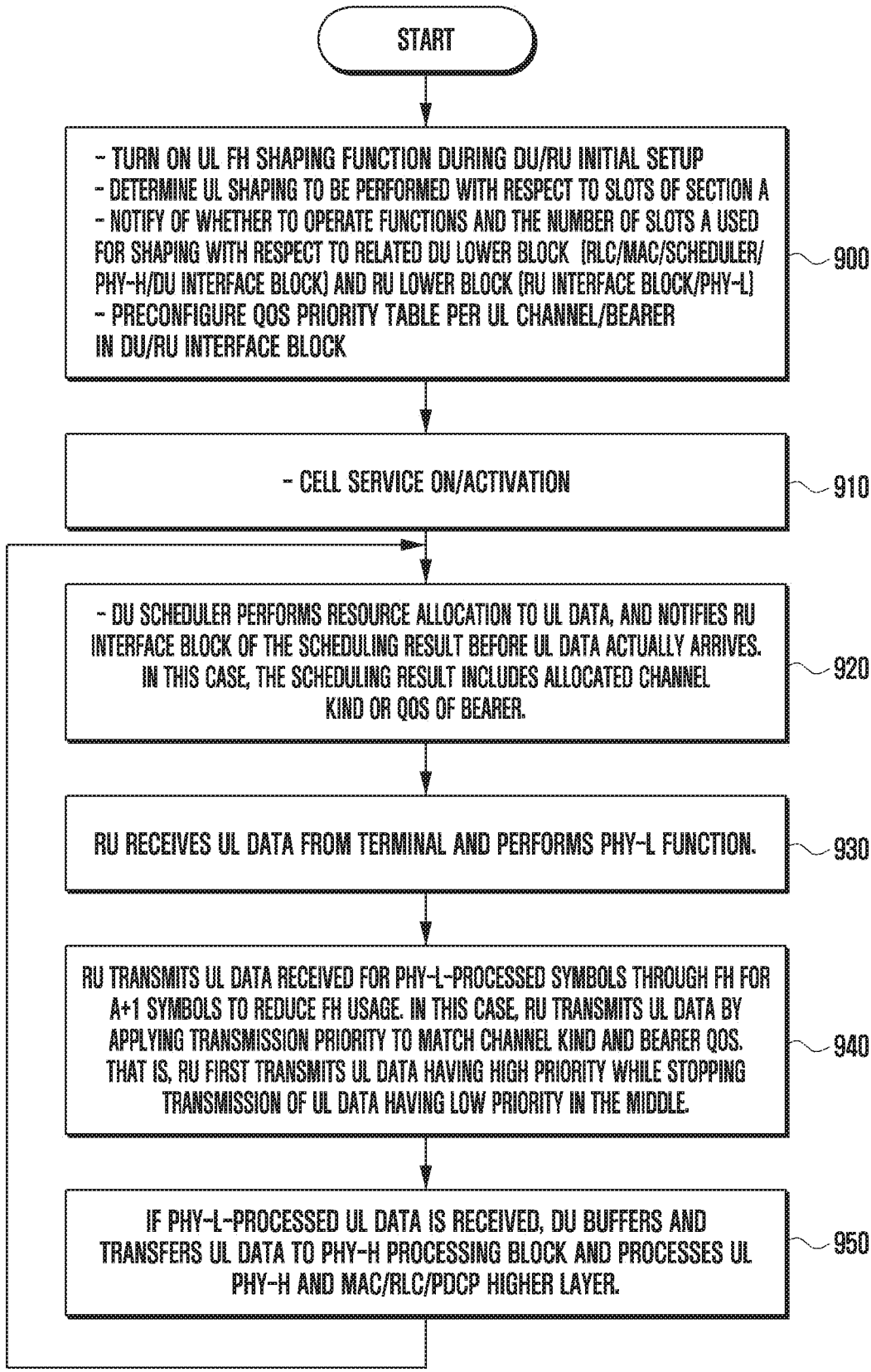
FIG. 9A is a diagram illustrating an according to an embodiment of the disclosure.

FIG. 9A is a diagram illustrating an example according to an embodiment of the disclosure.

Referring to FIG. 9A, during an initial setup of the RU and the DU, it may be configured to use a UL FH shaping function, and it may be determined how many slots (A slots) UL shaping is performed through. Whether to perform the UL FH shaping and the number A of slots being used for the shaping may be configured with respect to lower blocks included in a DU (radio link control (RLC), media access control (MAC), higher physical layer (PHY-H) (this may correspond to a right-side portion of an applied option in FIGS. 3A and 3B), scheduler, and DU interface controller) and lower blocks included in an RU (RU interface controller and lower physical layer (PHY-L) (this may correspond to a left-side portion of an applied option in FIGS. 3A and 3B). Further, the priority of the quality of service (QoS) for each UL channel and signal and bearer may be preconfigured in the RU and the DU (900).

Thereafter, a base station controlling a cell starts or activates the service (910). Thereafter, a DU scheduler performs resource allocation with respect to UL data (and control signal) (hereinafter, UL signal), and transmits the scheduling result to the RU before actual UL data is received (920). In this case, the scheduling result may include kinds of allocated channels and signals and the QoS of the bearer.

Thereafter, the RU receives the UL signal from the terminal, and processes the received UL signal by performing a PHY-L function (930). Thereafter, the RU transmits the UL signal received and processed for one symbol through an FH for A+1 symbols (940). In this case, the RU applies the priority of transmission in accordance with the channel kind and the QoS of the bearer. That is, the RU may first transmit the UL signal having a high priority while stopping transmission of the UL signal having a low priority, and then may transmit the UL signal having the low priority.

If the signal transmitted from the RU is received, the DU stores the data in a buffer, performs a PHY-H process, and then processes an higher layer function, such as MAC or RLC (950).

Figure 9B:
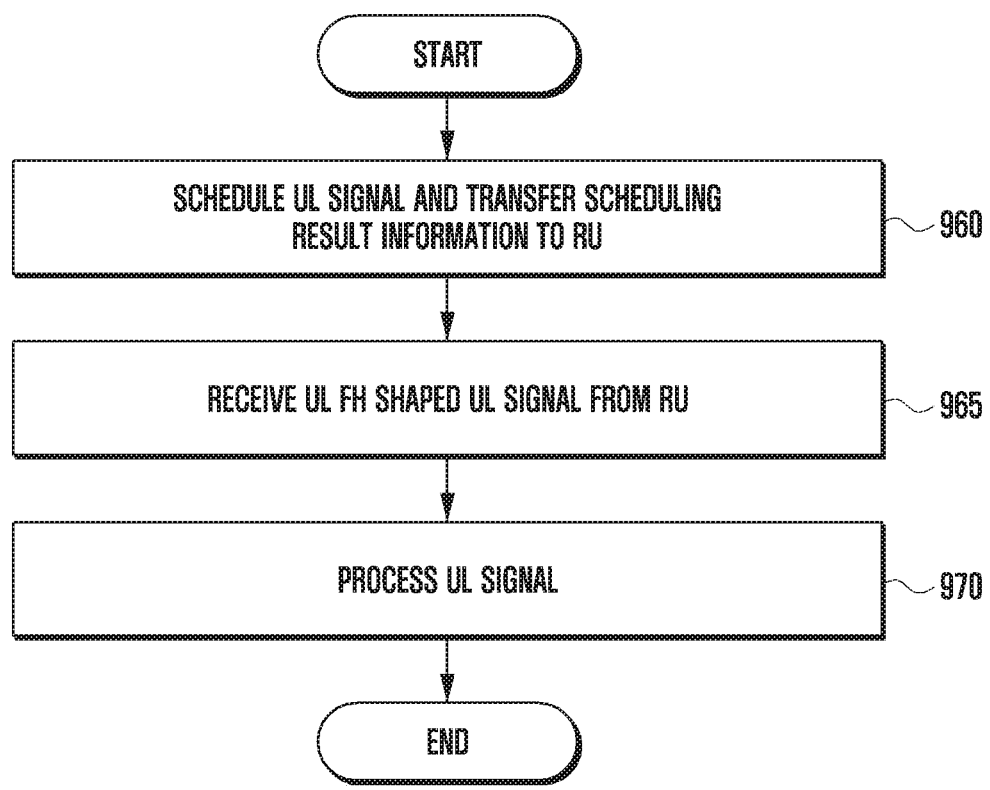
FIG. 9B is a diagram illustrating an operation of DU performing according to an embodiment of the disclosure.

FIG. 9B is a diagram illustrating an operation of DU according to an embodiment of the disclosure.

Referring to FIG. 9B, a DU schedules a UL signal (UL data, a UL control channel and a UL control signal may be included in the UL signal), and transmits scheduling result information to an RU (960). The scheduling result information may include kinds of allocated channels and signals, time and/or frequency resources allocated to the channels and signals, and QoS of a bearer related to the UL data. Thereafter, the DU receives UL FH shaped UL signal from the RU (965). Thereafter, the DU processes the received UL signal, and the above process includes processes in the PHY-H, MAC, and RLC (970).

Figure 9C:
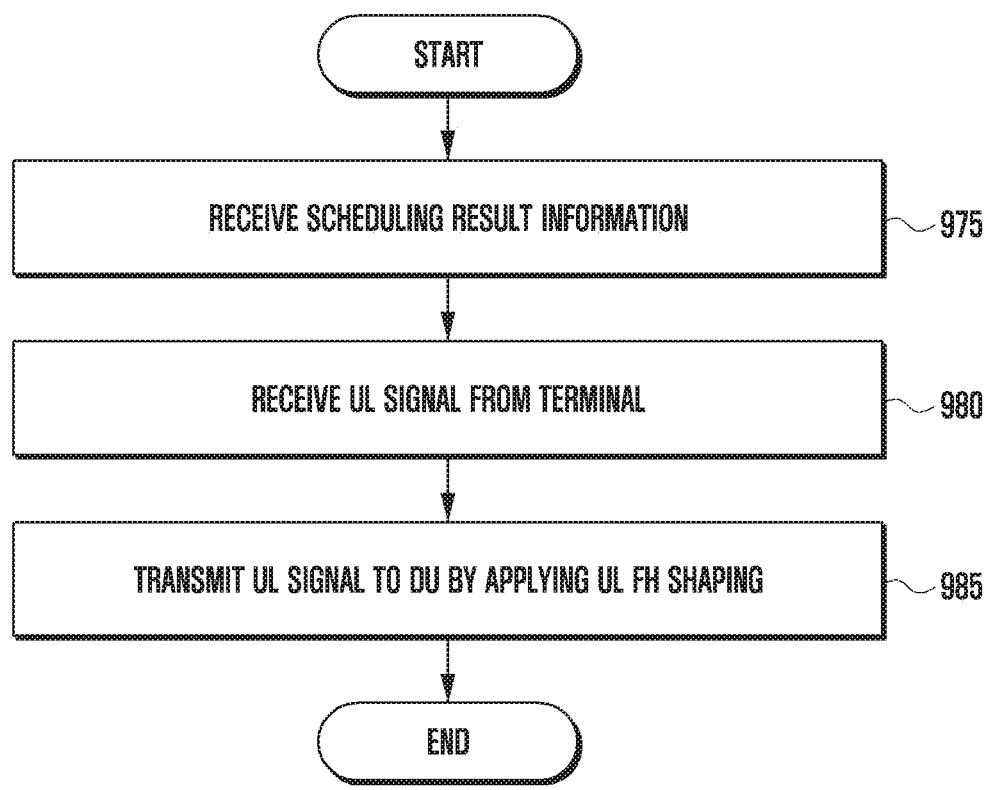
FIG. 9C is a diagram illustrating an operation of RU performing according to an embodiment of the disclosure.

FIG. 9C is a diagram illustrating an operation of RU according to an embodiment of the disclosure.

Referring to FIG. 9C, an RU receives scheduling result information from a DU (975). The scheduling result information may include kinds of allocated channels and signals, time and/or frequency resources allocated to the channels and signals, and QoS of a bearer related to UL data. Thereafter, the RU receives a UL signal from a terminal on the allocated resource (980). The RU processes the received signal by performing a PHY-L function, and transmits a UL signal received and processed for one symbol to the DU through an FH for a plurality of symbol intervals (985). In this case, in transmitting the UL signal, the RU applies the priority in accordance with the channel kind and the QoS of the bearer. That is, the RU may first transmit the UL signal having a high priority while stopping transmission of the UL signal having a low priority, and then may transmit the UL signal having the low priority.

Figure 10:
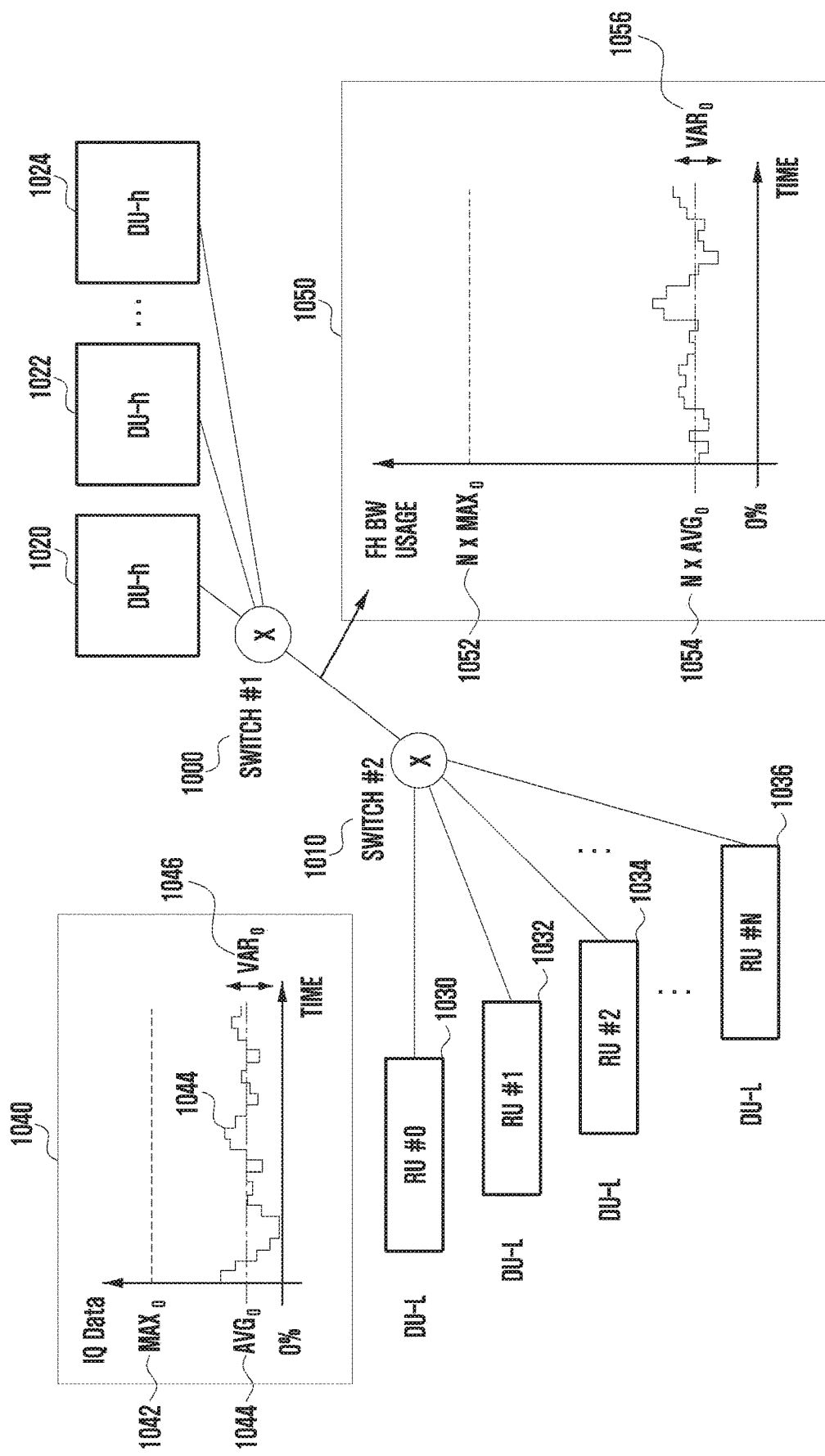
FIG. 10 is a diagram illustrating the structure of an fronthaul (FH) network according to an embodiment of the disclosure.

FIG. 10 is a diagram illustrating the structure of an FH network according to an embodiment of the disclosure.

Referring to FIG. 10, a plurality of DUs 1020, 1022, and 1024 may be connected to a plurality of RUs 1030, 1032, 1034, and 1036 through a first switch 1000 and a second switch 1010. That is, a plurality of DUs and RUs are structured to be connected to one another through a common FH.

In this case, designing of an FH capacity based on the maximum capacity of all RUs may be inefficient. According to "1040", even if the maximum throughput of the RU is $MAX_0$ 1042, the actual throughput of the RU is 1044, and $AVG_0$ 1044 that is an average of the actual throughputs may be greatly smaller than the maximum throughput. Further, the actual throughput 1044 of the RU has a dispersion of the average $AVG_0$ 1044 and $VAR_0$ 1046. In this case, the FH between the first switch 1000 and the second switch 1010 is not designed to process $N \times MAX_0$ 1052 (=maximum throughput of each RU×the number of RUs), but it is sufficient to design the FH to sufficiently process $N \times AVG_0$ 1054 (=average throughput of each RU×the number of RUs). Further, in such a design, it is required to consider $VAR_0$ 1056 that is a dispersion of the throughput of a plurality of RUs (1050). In the case of designing such a common FH, the FH bandwidth can be effectively reduced.

Further, if traffics of cells using a common FH are instantaneously exploded, the throughput of the common FH designed as described above may be insufficient (such a case is called FH congestion), and in consideration of such a case, it is necessary to configure the priority of information being transmitted between the RU and the DU and to first transmit the information having a high priority.

Figure 11:
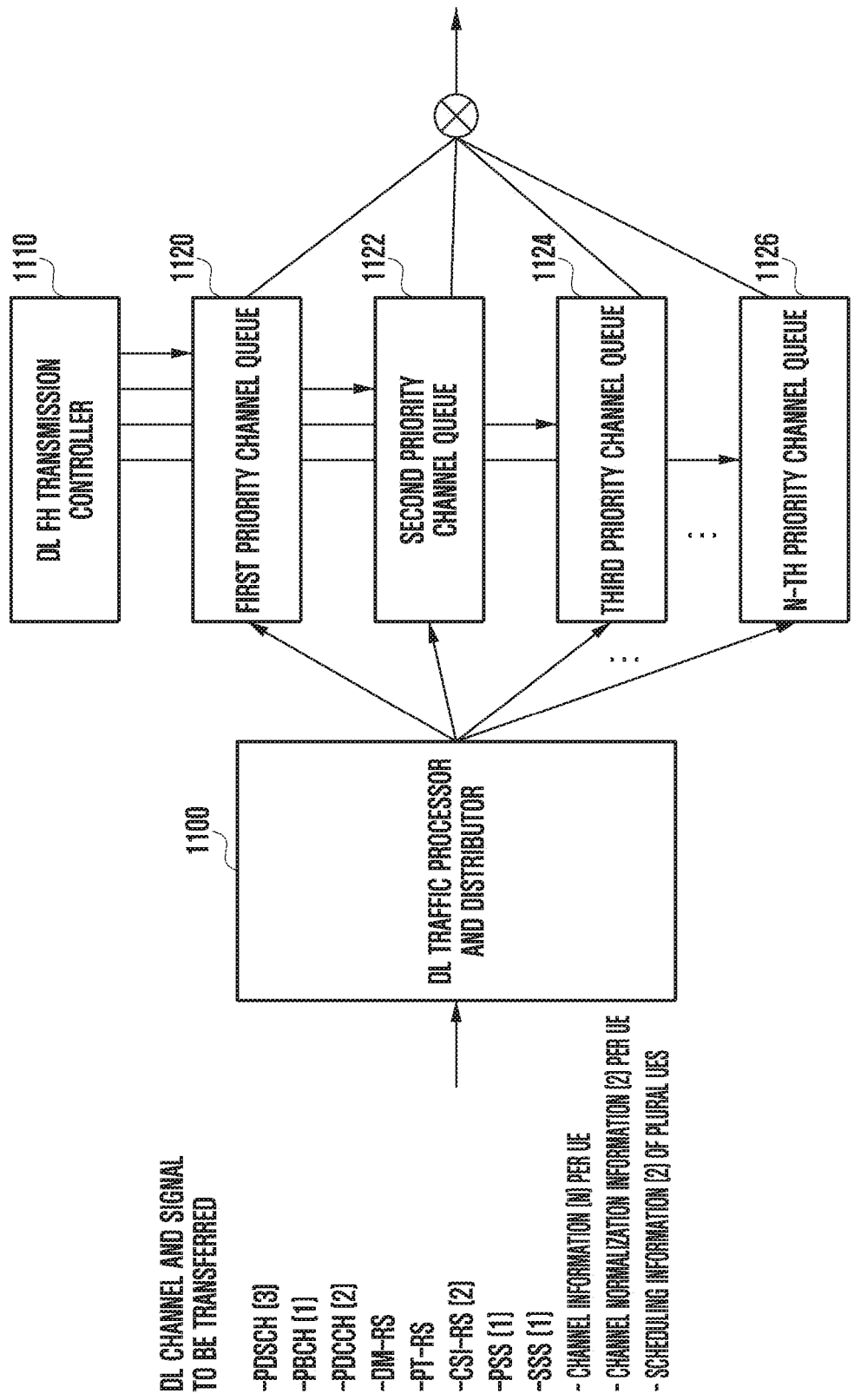
FIG. 11 is a diagram illustrating a method for applying a priority during FH congestion in the case of DL transmission according to an embodiment of the disclosure.

FIG. 11 is a diagram illustrating a method for applying a priority during FH congestion in the case of DL transmission according to an embodiment of the disclosure. The first switch 1000 of FIG. 10 may include a DL traffic distributor 1100 and a DL FH transmission controller 1110.

Referring to FIG. 11, the first switch 1000 may receive various DL signals intended to be transmitted from a plurality of DUs to a plurality of RUs. As an example, the DL signal may include a physical downlink shared channel (PDSCH) (DL data), a physical broadcast channel (PBCH) (master information block or system information), a physical downlink control channel (PDCCH) (DL control information), a demodulation reference signal (DMRS), a phase tracking reference signal (PTRS), a channel state information reference signal (CSI-RS), a primary synchronization signal (PSS), a secondary synchronization signal (SSS), channel information for each terminal, channel normalization information for each terminal, and scheduling information for a plurality of terminals. The DL traffic processor and distributor 1100 of the first switch 1000 having received such a DL signal may identify the priority of the channels and signals, and may distribute the respective DL channels and signals in accordance with a queue according to the identified priority.

The priority between DL signals may be determined in the order of a synchronization signal—common channel (channel for a plurality of terminals)—real-time control information transmission channel for individual terminal—real-time data transmission channel for individual terminal—channel for non-real-time transmission for individual terminal.

By applying the above-described priority, the PBCH, PSS, and SSS may be distributed to a first priority channel queue 1120, and this is because the above-described signals and channels are always necessary for a network access of the terminal. Further, channel normalization information for each PDCCH, CSI-RS, and UE and scheduling information for a plurality of terminals may be distributed to a second priority channel queue 1122, and this is because the above-described channels and signals are necessary to grasp the terminal scheduling and channel state information between the terminal and the base station. Further, the PDSCH may be distributed to a third priority channel queue 1124, and channel information for each UE may be distributed to the N-th priority channel queue 1126.

The respective DL signals distributed as above are transmitted to a common FH under the control of a DL FH transmission controller 1110. If the common FH capacity is sufficient to transmit all DL signals, all the DL signals can be transmitted, whereas if the common FH capacity is not sufficient to transmit all the DL signals, the DL FH transmission controller 1110 may control to first transmit the DL signal stored in the queue having a high priority through the common FH. In this case, if the DL signals stored in the queue having the high priority are transmitted through the common FH in all, the DL signals stored in the queue having the next priority may be transmitted.

Figure 12:
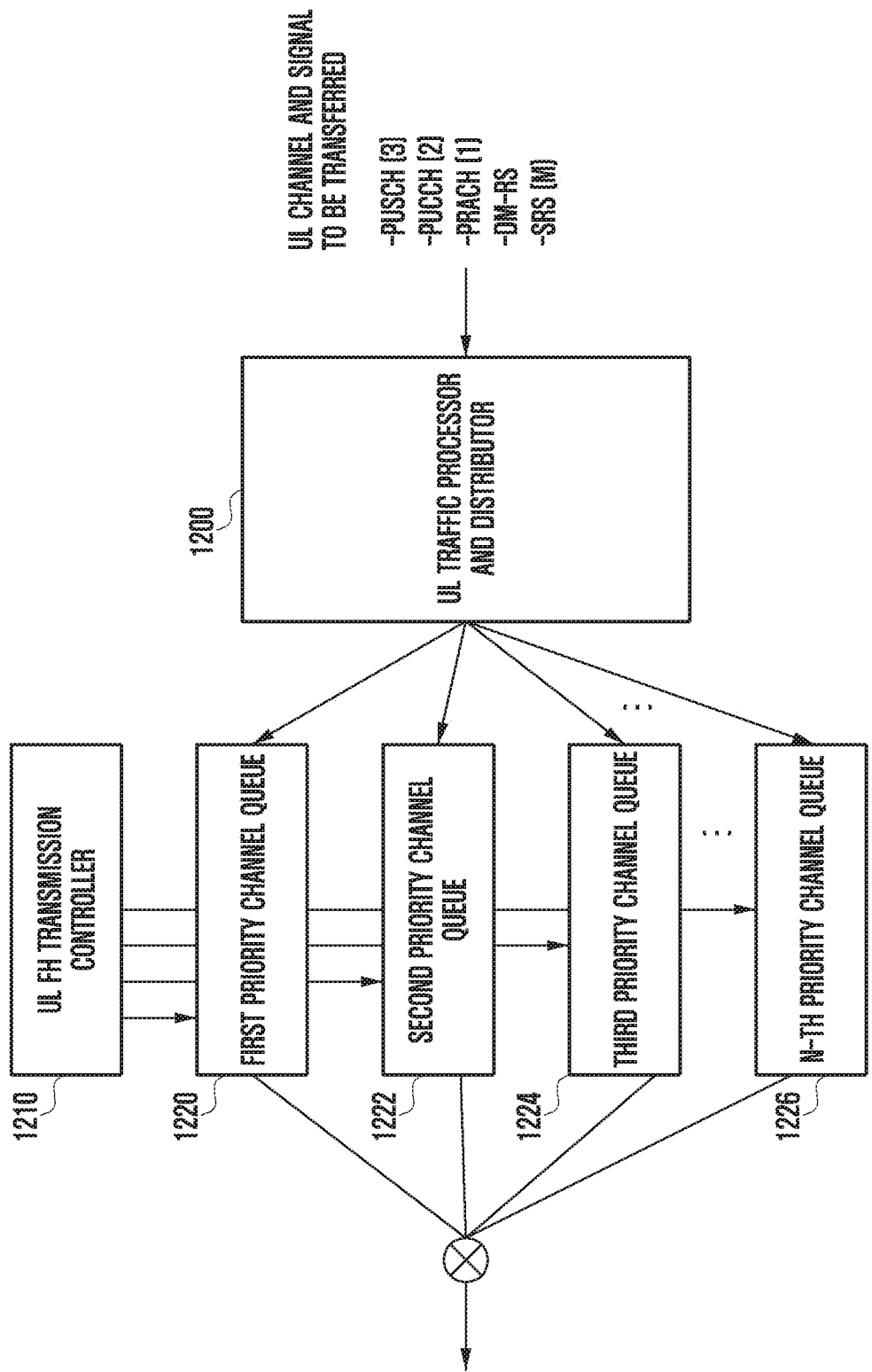
FIG. 12 is a diagram illustrating a method for applying a priority during FH congestion in the case of UL transmission according to an embodiment of the disclosure.

FIG. 12 is a diagram illustrating a method for applying a priority during FH congestion in the case of UL transmission according to an embodiment of the disclosure. The second switch 1010 of FIG. 10 may include a UL traffic distributor 1200 and a UL FH transmission controller 1210.

Referring to FIG. 12, the second switch 1010 may receive various UL signals intended to be transmitted from a plurality of RUs to a plurality of DUs. As an example, the UL signal may include a PUSCH, PUCCH, PRACH, DMRS, and SRS. The UL traffic processor and distributor 1200 of the second switch 1010 having received such a UL signal may identify the priority of the channels and signals, and may distribute the respective UL channels and signals in accordance with a queue according to the identified priority.

The priority between UL signals may be determined in the order of a synchronization signal—common channel (channel for a plurality of terminals)—real-time control information transmission channel for individual terminal—real-time data transmission channel for individual terminal—channel for non-real-time transmission for individual terminal.

By applying the above-described priority, the PRACH may be distributed to a first priority channel queue 1220, and this is because the above-described channels are always necessary for a network access of the terminal. Further, PUCCH may be distributed to a second priority channel queue 1222, and this is because the above-described channels are necessary to grasp whether the terminal has received the DL data and the channel state information between the terminal and the base station. Further, the PUSCH may be distributed to a third priority channel queue 1224, and the SRS may be distributed to the N-th priority channel queue 1226.

The respective UL signals distributed as above are transmitted to a common FH under the control of a UL FH transmission controller 1210. If the common FH capacity is sufficient to transmit all UL signals, all the UL signals can be transmitted, whereas if the common FH capacity is not sufficient to transmit all the UL signals, the UL FH transmission controller 1210 may control to first transmit the UL signal stored in the queue having a high priority through the common FH. In this case, if the UL signals stored in the queue having the high priority are transmitted through the common FH in all, the UL signals stored in the queue having the next priority may be transmitted.

Figure 13:
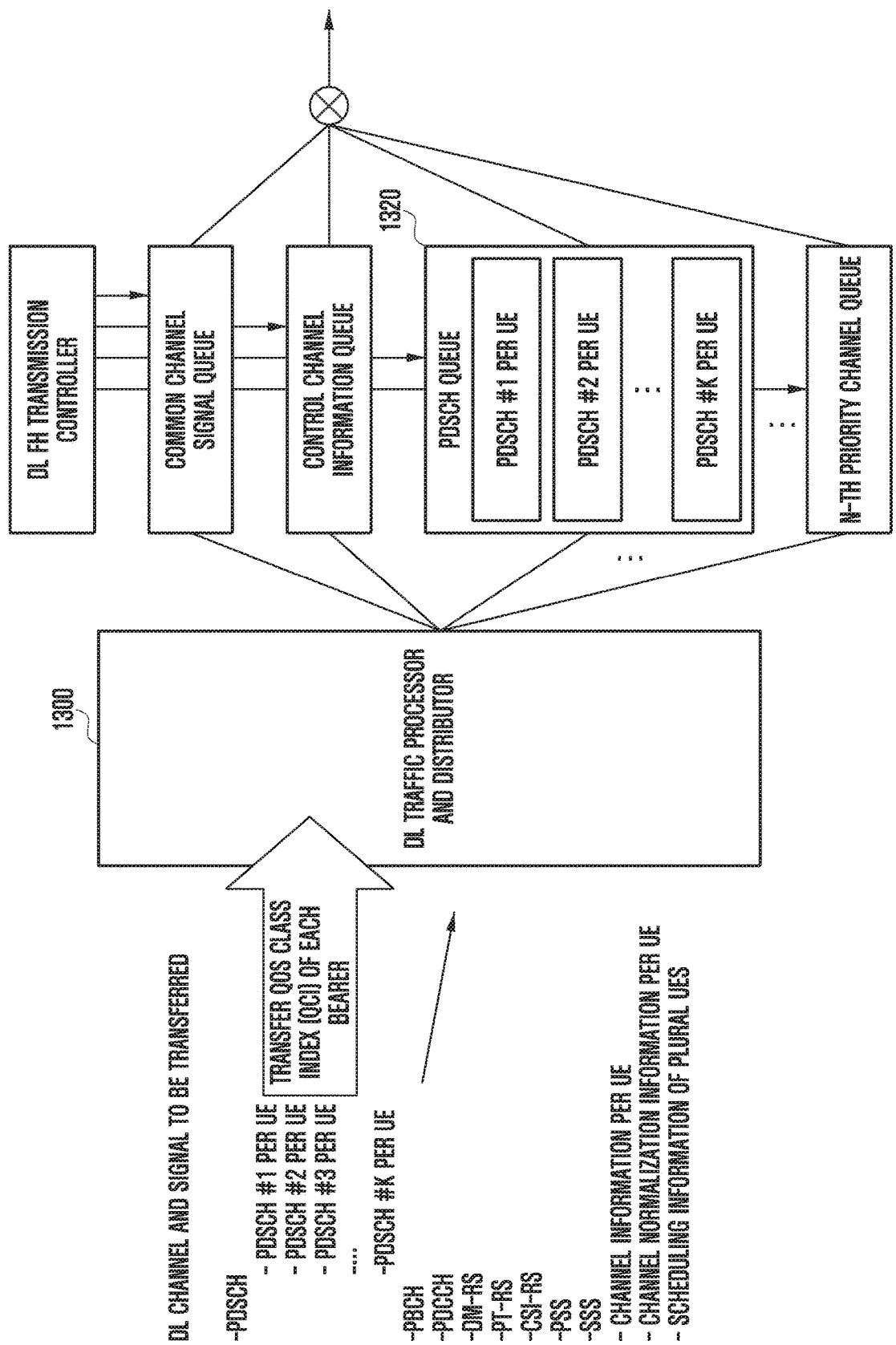
FIG. 13 is a diagram illustrating a method for applying a priority during FH congestion in the case of DL transmission in consideration of individual terminal and service priority according to an embodiment of the disclosure.

FIG. 13 is a diagram illustrating a method for applying a priority during FH congestion in the case of DL transmission in consideration of individual terminal and service priority according to an embodiment of the disclosure. The first switch 1000 of FIG. 10 may include a DL traffic distributor 1300 and a DL FH transmission controller 1310.

Referring to FIG. 13, the PDSCH transferred to the first switch 1000 includes DL data for each terminal. The DL data for each terminal is related to a specific bearer, and a QoS class index (QCI) of each bearer may be a determination basis of the priority or emergency of the DL data for each terminal. The DL traffic processor and distributor 1300 may store the DL data for each terminal in a PDSCH queue 1320 based on the QCI of the DL data for each terminal, and if the common FH is congested, it may control to transfer the DL data in accordance with the priority of the DL data for each terminal. Further, in FIG. 13, the DL data is exemplified, but in the same manner, UL data for each terminal can be transferred in accordance with the QCI when the common FH is congested.

Figure 14A:
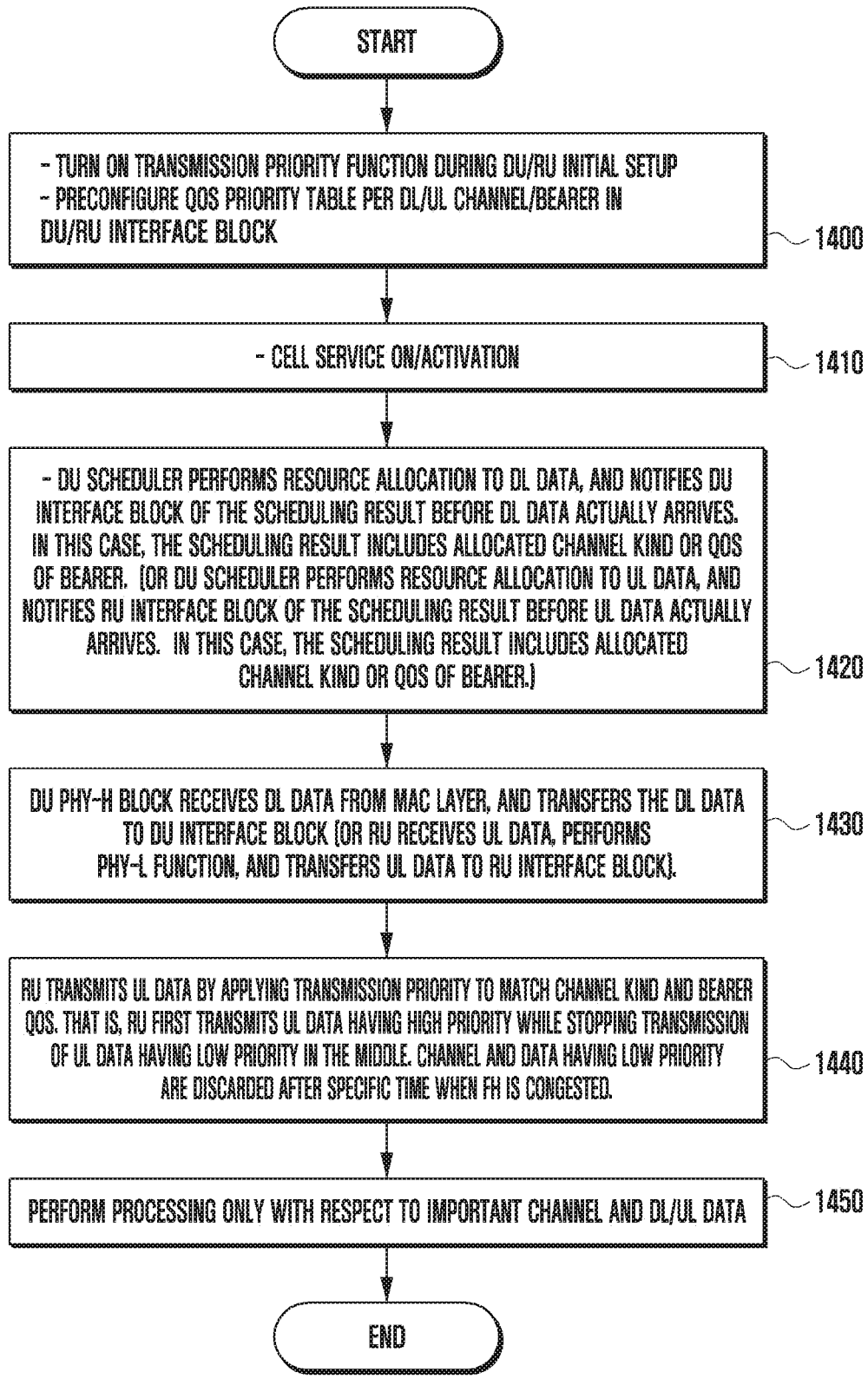
FIG. 14A is a diagram illustrating a method according to the disclosure to perform transmission in accordance with a priority in the case of using a common FH according to an embodiment of the disclosure.

FIG. 14A is a diagram illustrating a method according to the disclosure to perform transmission in accordance with a priority in the case of using a common FH according to an embodiment of the disclosure.

Referring to FIG. 14A, it illustrates an example in the case where a transmission in accordance with a priority is performed by an RU and a DU in contrast with the case of FIGS. 11 to 13.

Referring to FIG. 14A, the RU and the DH are configured (ON) to perform a priority based transmission during an initial setup. In this case, a priority in accordance with the kind of DL and EL signals and a priority in accordance with the QoS are preconfigured in the DU and the RU. The priority in accordance with the QoS may be identified by the QCI. In this case, the configuration can be set in an interface controller of the DU and an interface controller of the RU (1400).

Thereafter, a base station controlling a cell starts or activates a service (1410). A scheduler of the DU may perform resource allocation with respect to the DL signal, and may notify a DU interface controller of the scheduling result before the DL signal actually arrives at the DU. In this case, the scheduling result may include kinds of allocated channels and signals and/or the QoS of the bearer. In the case of the UL signal, the DU scheduler may perform the resource allocation to the UL signal, and may notify an RU interface controller of the scheduling result before the UL data actually arrives at the RU. In this case, the scheduling result information that the DU transmits to the RU may include the kinds of the allocated UL channels and signals and/or the QoS of the bearer (1420).

Thereafter, a PHY-H of the DU receives the DL signal from a MAC layer, and transfers the received DL signal to a DU interface controller. Further, in the case of a UL signal, the PHY-H processes the UL signal through the PHY-L function, and transfers the processed UL signal to an RU interface controller (1430). Thereafter, the DU first transmits the UL signal having a high priority based on the kind of the channel and the signal and/or the QoS of the bearer. In this case, the channel and the signal having the high priority may be controlled to be first transmitted while transmission of the channel and the signal having the low priority is stopped when the common FH is congested, and the channel and the signal having the low priority may be discarded after a specific time when the common FH is congested (1440). The above-described operation may be performed by a DU interface controller, and with respect to the DL signal, the above-described operation may also be performed by the RU. In the above-described method, the transmission through the common FH may be performed with respect to the important channels and signals and data having high importance (1450).

Figure 14B:
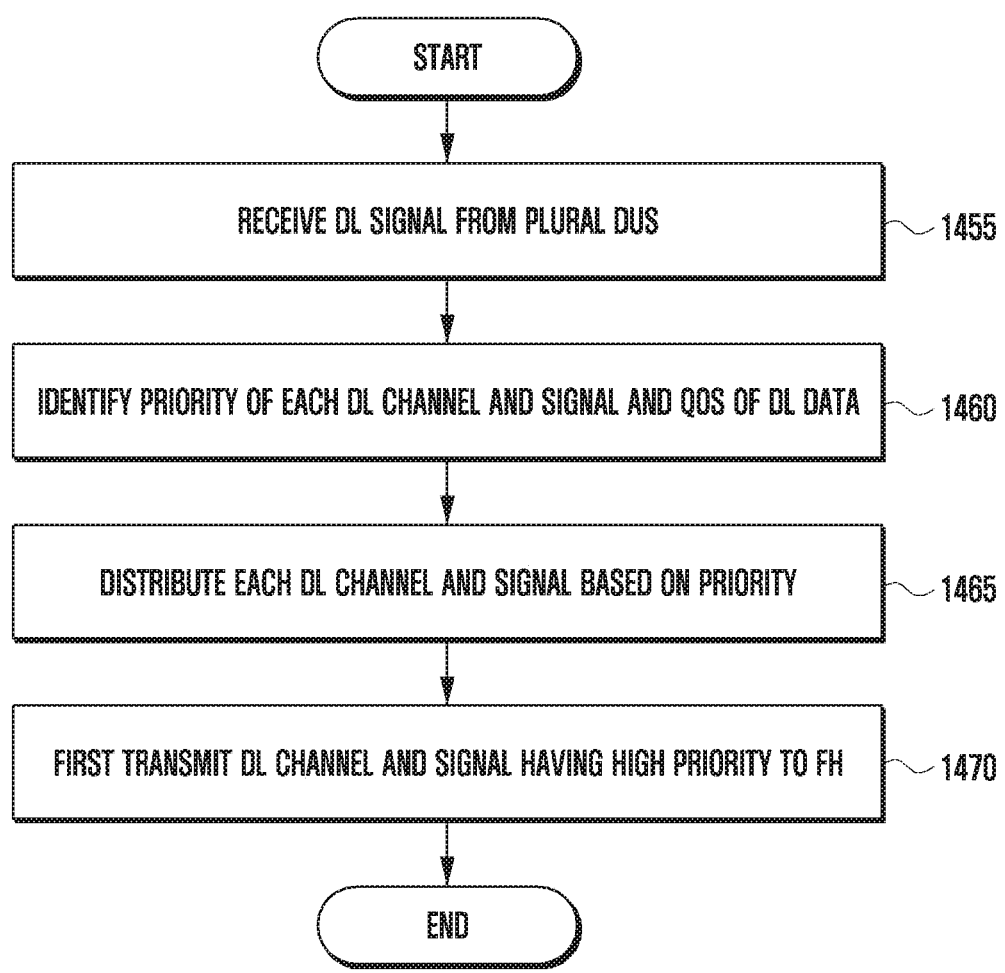
FIG. 14B is a diagram illustrating a method for processing a DL signal in the case where a first switch uses a common FH according to an embodiment of the disclosure.

FIG. 14B is a diagram illustrating a method for processing a DL signal in the case where a first switch uses a common FH according to an embodiment of the disclosure.

Referring to FIG. 14B, the first switch receives a DL signal from a plurality of DUs (1455). The DL signal may include various channels and signals as described above. In this case, the first switch identifies the priority of the respective DL channels and signals and the QoS of DL data (1460). The first switch distributes the respective DL channels and signals and DL data based on the priority (1465), and transmits the DL channels and signals having a high priority and the DL data corresponding to the QoS having a high priority to the common FH (1470).

Figure 14C:
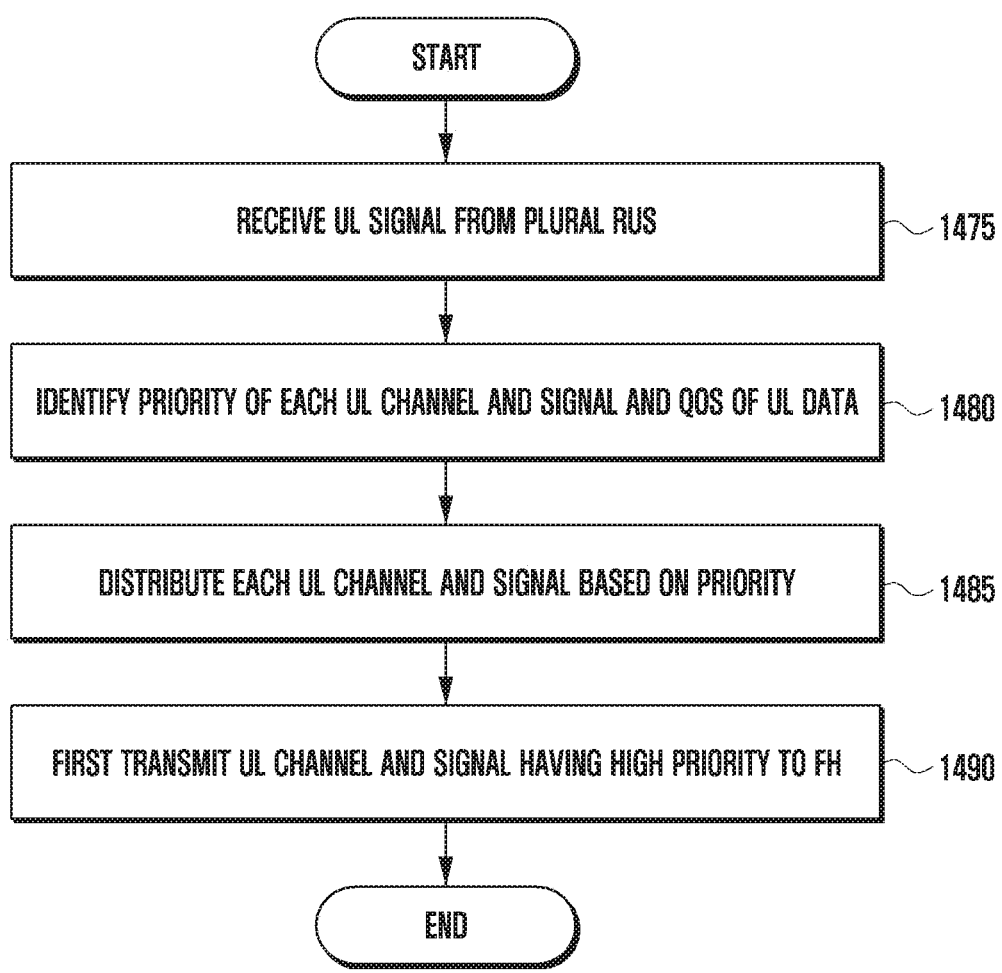
FIG. 14C is a diagram illustrating a method for processing a UL signal in the case where a second switch uses a common FH according to an embodiment of the disclosure.

FIG. 14C is a diagram illustrating a method for processing a UL signal in the case where a second switch uses a common FH according to an embodiment of the disclosure.

Referring to FIG. 14C, the second switch receives the UL signal from a plurality of RUs (1475). The UL signal may include various channels and signals as described above. In this case, the second switch identifies the priority of the respective UL channels and signals and the QoS of UL data (1480). The second switch distributes the respective UL channels and signals and the UL data based on the priority (1485), and transmits the UL channels and signals having a high priority and the UL data corresponding to the QoS having a high priority to the common FH (1490).

Figure 15:
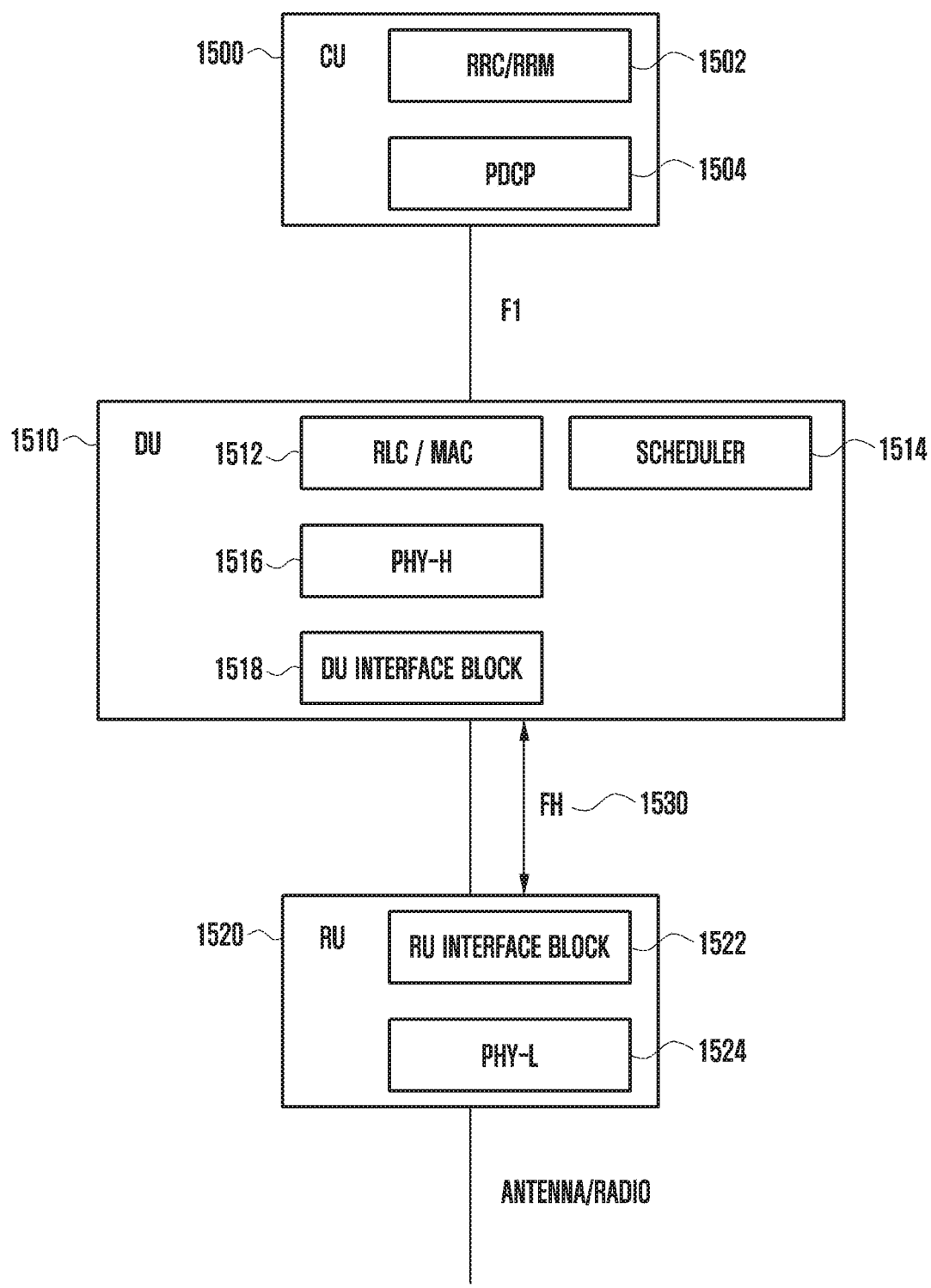
FIG. 15 is a diagram illustrating a base station system performing according to an embodiment of the disclosure.

FIG. 15 is a diagram illustrating a base station system according to an embodiment of the disclosure.

Referring to FIG. 15, the base station according to the disclosure may include a central unit (CU) 1500 including a packet data convergence protocol (PDCP) block 1504 and a block 1502 performing RRC and radio resource management (RRM) functions, a DU 1510 including an RLC and MAC block 1512, a scheduler 1514, a PHY-H block 1516, and a DU interface block 1518, and an RU 1520 including a PHY-L block 1524 and an RU interface block 1522. Such a system is merely exemplary, and embodiments described in the disclosure can be applied to blocks that are not the above-described blocks.

Figure 16:
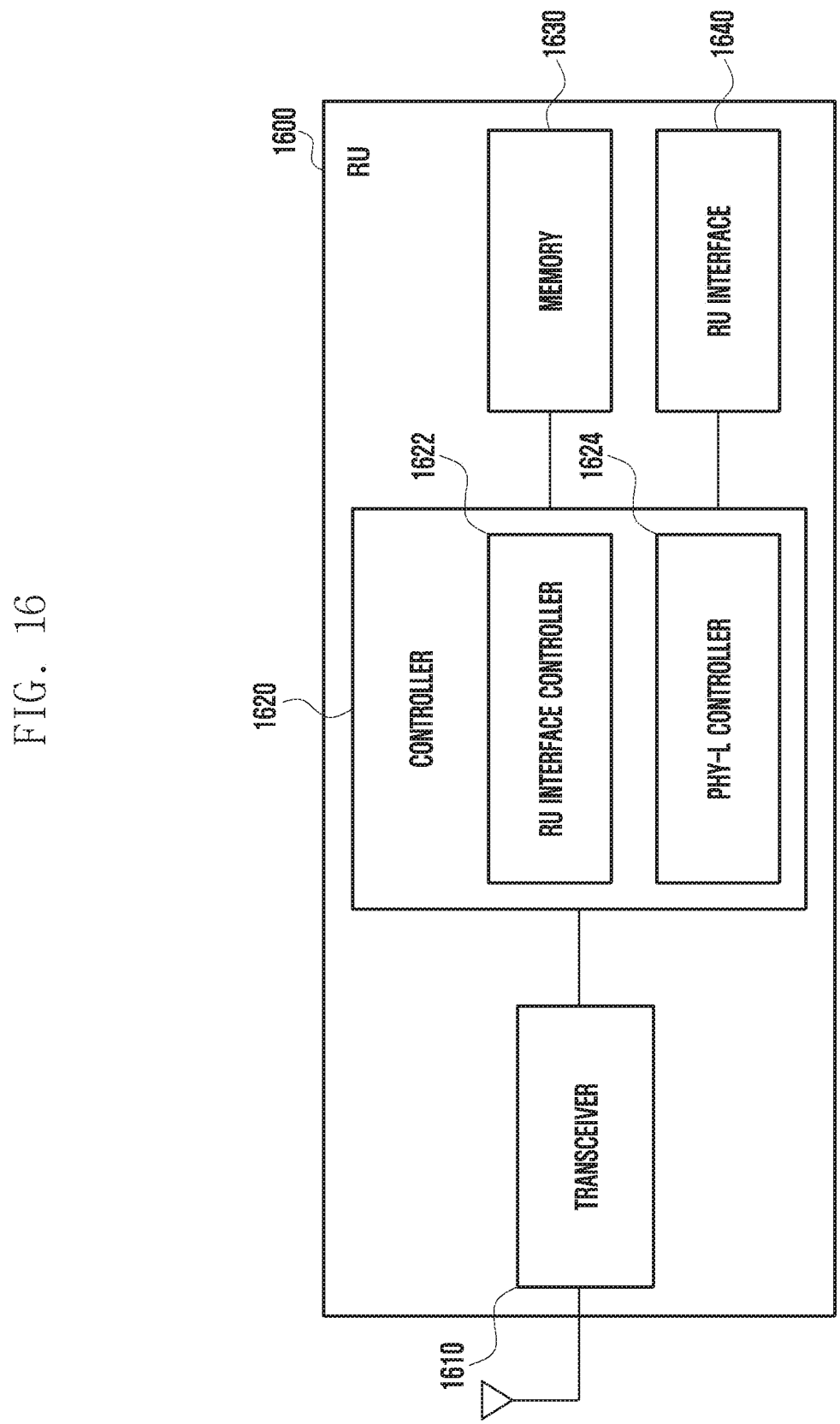
FIG. 16 is a diagram illustrating the structure of RU according to an embodiment of the disclosure.

FIG. 16 is a diagram illustrating the structure of RU according to an embodiment of the disclosure.

Referring to FIG. 16, an RU 1600 may include a transceiver 1610, a controller 1620 including an RU interface controller 1622 and a PHY-L controller 1624, a storage 1630, and an RU interface 1640. The transceiver 1610 performs wireless communication with a terminal, and may include a radio frequency (RF) transmitter up-converting and amplifying the frequency of a signal being transmitted and an RF receiver low-noise-amplifying a signal being received and down-converting the frequency of the signal. The RU interface 1640 may perform signal transmission and reception through a wired connection to a DU, and may be controlled through the RU interface controller 1622. The PHY-L controller 1624 controls to generate a signal to be transmitted to the terminal by performing PHY-L processing of the signal received from the DU through the RU interface 1640. Further, the storage 1630 may store information necessary for communication between the RU and the DU and communication between the RU and the terminal and signals being transmitted and received. Through the above-described operation, the controller 1620 may control the respective blocks of the RU to perform embodiments of the disclosure.

Figure 17:
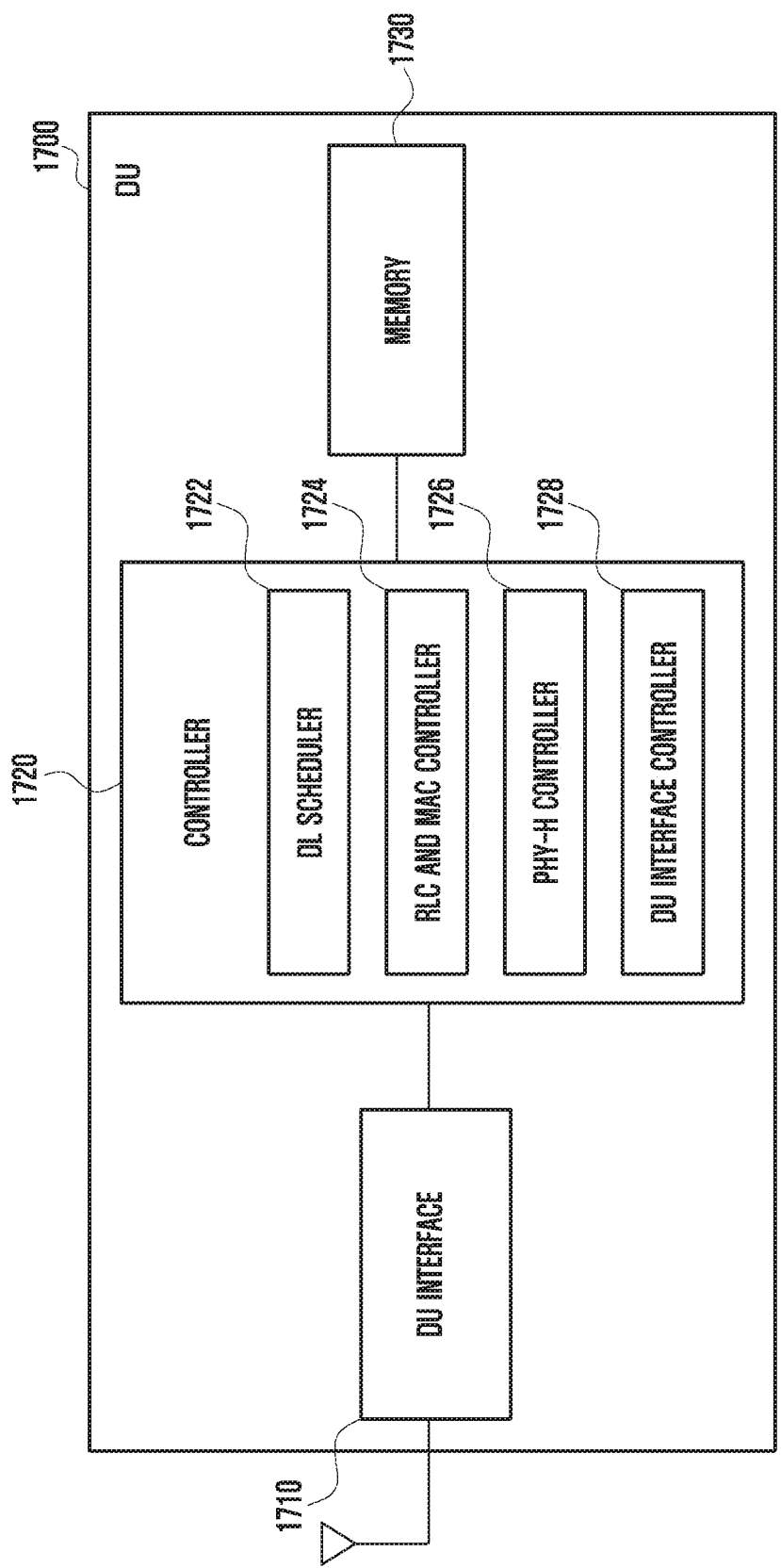
FIG. 17 is a diagram illustrating the structure of DU according to an embodiment of the disclosure.

FIG. 17 is a diagram illustrating the structure of DU according to an embodiment of the disclosure.

Referring to FIG. 17, a DU 1700 may include a DU interface 1710, a controller 1720 including a scheduler 1722, an RLC and MAC controller 1724, a PHY-H controller 1726, and a DU interface controller 1728, and a storage 1730. The DU interface 1710 performs signal transmission and reception through wired connections between an RU and a DU and between the DU and a CU, and such an operation may be performed through the DU interface controller 1728. The scheduler 1722 may schedule a DL signal and a UL signal of a terminal, and may transmit scheduling result information to the RU through the DU interface 1710. The PHY-H controller 1726 controls to perform the PHY-H function with respect to a signal received from the RU and a signal to be transmitted to the RU, and the RLC and MAC controller 1724 controls to perform the function of the RLC and MAC layer with respect to the signal received from the RU and the signal to be transmitted to the RU. The storage 1730 may store information necessary for communication between the RU and the DU and communication between the DU and a CU and signals being transmitted and received. Through the above-described operation, the controller 1720 may control the respective blocks of the DU to perform embodiments of the disclosure.

Figure 18:
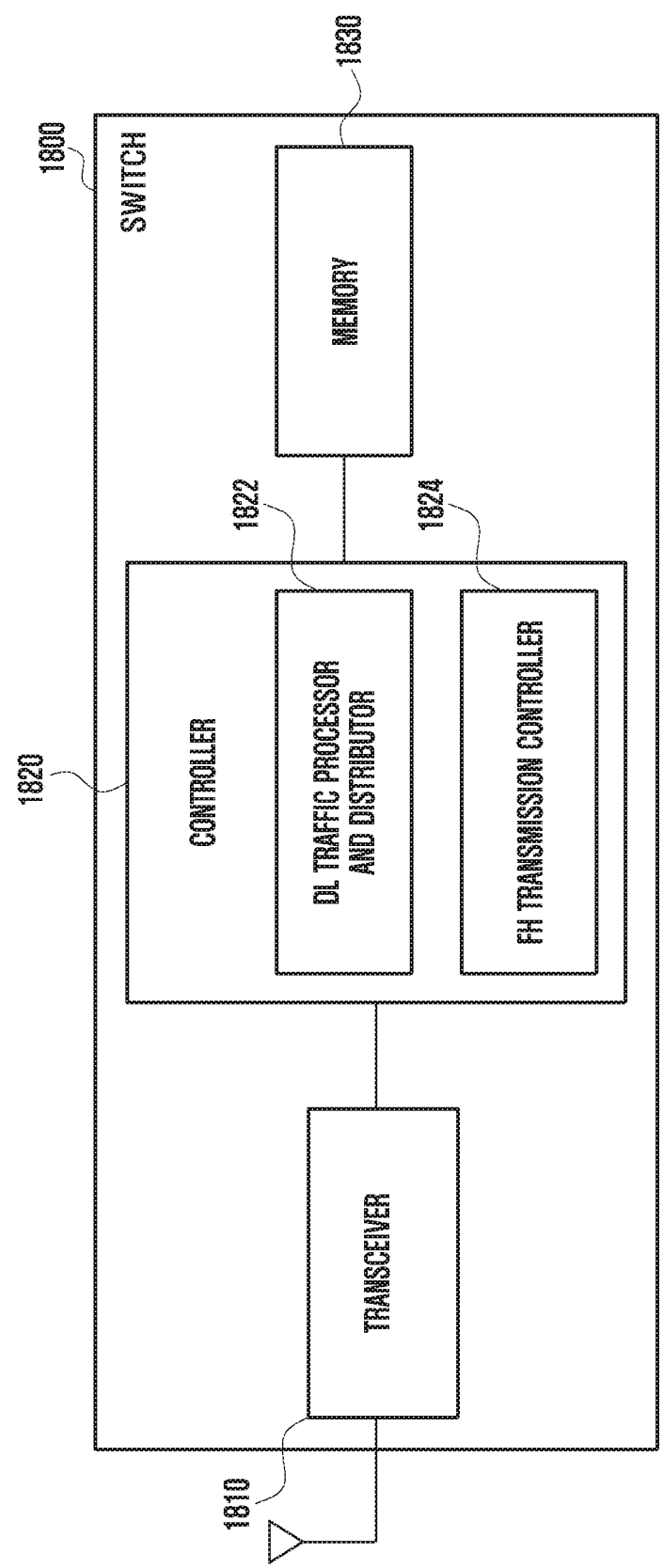
FIG. 18 is a diagram illustrating the structure of a switch according to an embodiment of the disclosure.

FIG. 18 is a diagram illustrating the structure of a switch according to an embodiment of the disclosure.

Referring to FIG. 18, a switch 1800 may include a transceiver 1810, a controller 1820 including a traffic processor and distributor 1822 and an FH transmission controller 1824, and a storage 1830. The transceiver 1810 performs signal transmission and reception between the switch, an RU and a DU, and the traffic processor and distributor 1822 operates to distribute signals based on the priority of respective channels and signals included in the signals received through the switch. The FH transmission controller 1824 controls to transmit the channels and signals having a high priority through a common FH. The storage 1830 may store signals received from the RU or the DU and control information necessary for the signal transmission and reception.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for transmitting signals by a first device of a base station transmitting and receiving signals of a wireless communication system, the method comprising:
   receiving a plurality of uplink signals from a plurality of terminals for a first time duration;
   identifying uplink transmission shaping information to be applied to the plurality of uplink signals; and
   transmitting the plurality of uplink signals to a second device using a fronthaul based on the uplink transmission shaping information,
   wherein the uplink transmission shaping information comprises information indicating a number of time intervals to transmit the plurality of uplink signals using the fronthaul,
   wherein the plurality of uplink signals are transmitted by the first device to the second device for a second time duration determined based on the uplink transmission shaping information and the first time duration, and
   wherein the second time duration corresponds to a decreased portion of a fronthaul frequency band and an increased number of time intervals.

2. The method of claim 1, further comprising:
   receiving the uplink transmission shaping information from the second device.

3. The method of claim 1, further comprising:
   receiving scheduling information of the plurality of uplink signals from the second device,
   wherein reception of the plurality of uplink signals is performed based on the scheduling information.

4. The method of claim 1, further comprising:
   identifying a priority of each channel and signal included in the plurality of uplink signals,
   wherein the plurality of uplink signals to which the uplink transmission shaping is applied are transmitted to the second device based on the priority.

5. The method of claim 4, wherein the priority is determined in an order of information related to an initial access of the plurality of terminals, control information for the plurality of terminals, control information for an individual terminal, and data for the individual terminal.

6. The method of claim 4, wherein a priority of data for each of the terminals among the plurality of uplink signals is identified based on a quality of service (QoS) of a bearer related to the data for each of the terminals.

7. A method for receiving signals by a second device of a base station transmitting and receiving signals of a wireless communication system, the method comprising:
   identifying uplink transmission shaping information to be applied to a plurality of uplink signals; and
   receiving, from a first device, the plurality of uplink signals to which uplink transmission shaping is applied using a fronthaul based on the uplink transmission shaping information,
   wherein the uplink transmission shaping information is information indicating a number of time intervals to transmit the plurality of uplink signals using the fronthaul,
   wherein, in case that the plurality of uplink signals are scheduled to be received by the first device for a first time duration, the plurality of uplink signals to which the uplink transmission shaping is applied are transmitted by the first device to the second device for a time determined based on the uplink transmission shaping information and the first time duration, and
   wherein the first time duration corresponds to a decreased portion of a fronthaul frequency band and an increased number of time intervals.

8. The method of claim 7, further comprising:
   transmitting the uplink transmission shaping information to the second device.

9. The method of claim 7, further comprising:
   performing scheduling of the plurality of uplink signals; and
   transmitting scheduling information of the plurality of uplink signals to the second device.

10. The method of claim 7, further comprising:
    identifying a priority of each channel and signal included in the plurality of uplink signals; and
    identifying the transmitted plurality of uplink signals to which the uplink transmission shaping is applied based on the priority.

11. The method of claim 10, wherein the priority is determined in an order of information related to an initial access of a plurality of terminals, control information for the plurality of terminals, control information for an individual terminal, and data for the individual terminal.

12. The method of claim 10, wherein a priority of data for each of a plurality of terminals among the plurality of uplink signals is identified based on a quality of service (QoS) of a bearer related to the data for each of the terminals.

13. A first device of a base station transmitting and receiving signals of a wireless communication system, the first device comprising:
    a transceiver configured to transmit and receive signals with a plurality of terminals;
    an interface configured to transmit and receive signals with a second device; and
    a processor connected to the transceiver and the interface and configured to:
      receive a plurality of uplink signals from the plurality of terminals for a first time duration,
      identify uplink transmission shaping information to be applied to the plurality of uplink signals, and
      transmit the plurality of uplink signals to a second device using a fronthaul based on the uplink transmission shaping information,
    wherein the uplink transmission shaping information is information indicating a number of time intervals to transmit the plurality of uplink signals using the fronthaul,
    wherein the plurality of uplink signals are transmitted by the first device to the second device for a second time duration determined based on the uplink transmission shaping information and the first time duration, and wherein the second time duration corresponds to a decreased portion of a fronthaul frequency band and an increased number of time intervals.

14. The first device of claim 13, wherein the processor is further configured to receive the uplink transmission shaping information from the second device.

15. The first device of claim 13,
wherein the processor is further configured to receive scheduling information of the plurality of uplink signals from the second device, and
wherein reception of the plurality of uplink signals is performed based on the scheduling information.

16. The first device of claim 13,
wherein the processor is further configured to identify a priority of each channel and signal included in the plurality of uplink signals, and
wherein the plurality of uplink signals to which the uplink transmission shaping is applied are transmitted to the second device based on the priority.

17. The first device of claim 16, wherein the priority is determined in an order of information related to an initial access of the plurality of terminals, control information for the plurality of terminals, control information for an individual terminal, and data for the individual terminal.

18. The first device of claim 16, wherein a priority of data for each of the terminals among the plurality of uplink signals is identified based on a quality of service (QoS) of a bearer related to the data for each of the terminals.

19. A second device of a base station transmitting and receiving signals of a wireless communication system, the second device comprising:
an interface configured to transmit and receive signals with a first device; and
a processor connected to the interface and configured to:
identify uplink transmission shaping information to be applied to a plurality of uplink signals, and
receive, from the first device, the plurality of uplink signals to which uplink transmission shaping is applied using a fronthaul based on the uplink transmission shaping information,
wherein the uplink transmission shaping information is information indicating a number of time intervals to transmit the plurality of uplink signals using the fronthaul,
wherein, in case that the plurality of uplink signals are scheduled to be received by the first device for a first time duration, the plurality of uplink signals to which the uplink transmission shaping is applied are transmitted by the first device to the second device for a time duration determined based on the uplink transmission shaping information and the first time duration, and
wherein the first time duration corresponds to a decreased portion of a fronthaul frequency band and an increased number of time intervals.

20. The second device of claim 19, wherein the processor is further configured to transmit the uplink transmission shaping information to the second device.

21. The second device of claim 19, wherein the processor is further configured to perform scheduling of the plurality of uplink signals and to transmit scheduling information of the plurality of uplink signals to the second device.

22. The second device of claim 19, wherein the processor is further configured to identify a priority of each channel and signal included in the plurality of uplink signals and to identify the transmitted plurality of uplink signals to which the uplink transmission shaping is applied based on the priority.

23. The second device of claim 22, wherein the priority is determined in an order of information related to an initial access of a plurality of terminals, control information for the plurality of terminals, control information for an individual terminal, and data for the individual terminal.

24. The second device of claim 22, wherein a priority of data for each of a plurality of terminals among the plurality of uplink signals is identified based on a quality of service (QoS) of a bearer related to the data for each of the terminals.

* * * * *